(12) United States Patent
Hojjati

(10) Patent No.: US 12,088,739 B2
(45) Date of Patent: Sep. 10, 2024

(54) VALIDATION OF IMAGES VIA DIGITALLY SIGNED TOKENS

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 296 days.

(21) Appl. No.: 17/660,130

(22) Filed: Apr. 21, 2022

(65) Prior Publication Data

US 2023/0344650 A1 Oct. 26, 2023

(51) Int. Cl.
*H04L 29/00* (2006.01)
*H04L 9/00* (2022.01)
*H04L 9/32* (2006.01)

(52) U.S. Cl.
CPC .......... *H04L 9/3268* (2013.01); *H04L 9/3239* (2013.01); *H04L 9/3247* (2013.01); *H04L 9/50* (2022.05)

(58) Field of Classification Search
CPC ... H04L 9/3268; H04L 9/3239; H04L 9/3247; H04L 9/50; H04L 9/321; H04L 9/3234
See application file for complete search history.

(56) References Cited

U.S. PATENT DOCUMENTS

| | | | | |
|---|---|---|---|---|
| 2001/0047476 A1* | 11/2001 | Yen | ...................... | G06T 1/0028 713/168 |
| 2002/0056043 A1* | 5/2002 | Glass | ...................... | G06F 21/32 713/179 |
| 2014/0351910 A1* | 11/2014 | Tenenboym | ......... | G06Q 20/401 726/7 |
| 2015/0074415 A1* | 3/2015 | Tanner | .................. | H04L 9/3263 713/168 |
| 2016/0019538 A1* | 1/2016 | Arif | .......................... | G06T 7/90 705/44 |
| 2017/0351771 A1* | 12/2017 | Gallenbacher | ...... | G06F 16/9535 |
| 2021/0248446 A1* | 8/2021 | Hughes | .................. | G06F 18/22 |

OTHER PUBLICATIONS

The Trust Project—We Help Over Half A Billion People Easily Assess The Integrity Of News Worldwide. And We're Growing Fast, available online, retrieved Nov. 2022 from https://thetrustproject.org.

(Continued)

*Primary Examiner* — Ghazal B Shehni
(74) *Attorney, Agent, or Firm* — Baratta Law PLLC; Lawrence A. Baratta, Jr.

(57) ABSTRACT

Features are disclosed for the validation of an image and the verification of the validation of a validated image. A computing device can receive a request to validate an image. The computing device can validate the image and generate a validated image. The computing device may embed a signed token in the validated image. The signed token may include a digital certificate associated with a publisher of the image, a hash of a portion of the image, and metadata associated with the image. The computing device may store the hash of the portion of the image on a blockchain and provide the validated image. A client computing device may verify the validation of the validated image using the digital certificate, the hash of the portion of the image stored in the signed token, the hash of the portion of the image stored on the blockchain, and the metadata.

26 Claims, 10 Drawing Sheets

(56) References Cited

OTHER PUBLICATIONS

NewsGuard—Online Safety For Readers, Brands, And Democracies, available online, retrieved Nov. 2022 from https://www.newsguardtech.com.
NewsGuard—Misinformation Fingerprints, available online, retrieved Nov. 2022 from https://www.newsguardtech.com/solutions/misinformation-fingerprints/.

* cited by examiner

VALIDATION OF IMAGES VIA DIGITALLY SIGNED TOKENS

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
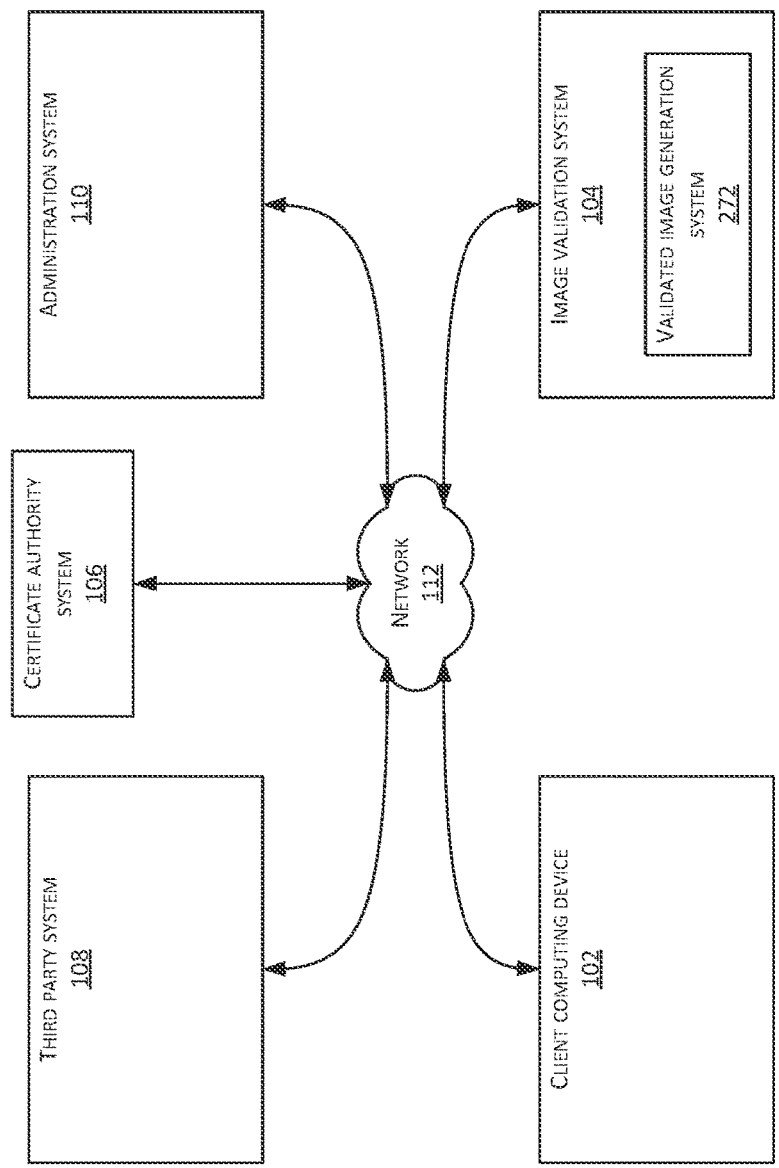
FIG. 1 depicts a schematic diagram of an example networked environment according to some embodiments.

In a networked environment with digital interactions occurring between millions and billions of interconnected computing devices, it can be difficult to determine the trustworthiness and/or accuracy of the digital interactions. Specifically, in the era of disinformation and as disinformation becomes easier to spread via social media, it may be difficult to determine whether digital interactions with a computing device (providing data) are trustworthy (or a level of trustworthiness of the digital interactions). A website may provide data (e.g., image data, textual data, etc.) associated with (provided by) a computing device (e.g., a picture) to a user that may not be trustworthy (e.g., disinformation, misinformation, fake news, etc.). For example, the website may provide data (e.g., a picture) and a representation of the data (e.g., a caption, a source, a title, a time, etc.) and the data and/or the representation of the data may not be trustworthy and/or accurate.

In some cases, a computing device may obtain (e.g., generate) data and provide access to the data to another computing device (e.g., by causing display of the data on a website). Prior to providing access to the data to the another computing device, the computing device may alter (manipulate) the data (e.g., deliberately or not deliberately) such that the altered data does not represent the data. For example, the computing device may alter the data (e.g., by modifying pixels of a picture), a representation or description of the data (e.g., by altering a source of the data), etc. By altering the data, another computing device accessing the altered data may be unable to determine an accuracy of the altered data (as compared to the data) and/or a trustworthiness of the altered data. Therefore, a user may trust data (and implement future actions based on trusting the data) that may not be accurate and/or trustworthy (e.g., may not accurately represent ground truth data).

Additionally, the data provided by a computing device may be hijacked and altered. For example, an application may provide an image (e.g., image data) identifying a particular scene. An untrusted entity may obtain the image and alter the image. For example, the image may identify a scene of two people shaking hands and the altered image may identify a scene of two people fighting, the image may identify a scene with three people and the altered image may identify a scene with two people, etc. Therefore, the image may be altered such that it does not accurately represent the scene (e.g., a scene that is identified by a description of the image, a scene that previously occurred, etc.) For example, an image may be altered such that it represents a different scene than the scene identified by the description of the image (e.g., the description of the image indicates that it depicts a politician at an event in 2020 when the image actually depicts a different person at an event in 2012). In the era of disinformation, such an alteration of data may be common and it may be difficult for a user to determine whether provided data is accurate (e.g., whether an image accurately represents a scene).

By altering the image in such a manner, the perception and/or reaction of a consumer can be manipulated. For example, a consumer may have a first reaction to a scene associated with a first image and a second reaction to a scene associated with a second image (e.g., the consumer may react positively to a scene associated with an image and negatively to a scene associated with an altered image). Therefore, such alterations to an image can affect how a consumer views a scene (and takes a corresponding action). In some cases, such alterations to an image can affect how a computing device determines a next action. A perception system may determine one or more actions (e.g., actions for a vehicle) based on image data. For example, the perception system may implement a braking action if the image data indicates that a pedestrian is located in a crosswalk and implement a maintaining speed action if the image data indicates that a pedestrian is not located in a crosswalk. Therefore, it can be important to validate images and verify such validation of the images.

Given the number of digital interactions between computing devices (e.g., billions of digital interactions), it is impractical, if not impossible, for a human to attempt to review the data being routed between the devices and provide indications as to their trustworthiness and/or accuracy. This becomes even less possible given the highly dynamic nature of the digital environment and that the data is to be repeatedly validated and tested, and monitored to determine their trustworthiness and/or accuracy over time. Further, a computing device may alter the data in such a manner such that it is impractical, if not impossible, for a human eye to identify that the data has been altered and is not trustworthy and/or accurate.

Images can provide useful information about a scene. For example, news websites can provide images that show scenes around the world. As discussed above, based on receiving this information, consumers can determine how to act. A consumer may obtain an image and determine a next action based on the obtained image. For example, a consumer may obtain an image identifying a politician and, based on that image, the consumer may change how the consumer votes, shops, volunteers, or otherwise acts. Therefore, images provided to consumers can be powerful and may have an increased influence on the actions and/or behaviors of consumers.

Determining that the images are validated and can be trusted can be helpful as consumers value applications and/or sources that provide a trusted indication or verification of a validation of image indicating that the image is accurate and/or trustworthy. To provide this indication of a validation of an image, the indication can be displayed as part of the communications between computing systems, such as based on an interaction of a consumer with an image, to verify that the image is validated.

A consumer may interact with the image to request verification of a validation of the image. For example, the image may be displayed via any type of application including a computer application, a virtual reality application, a medical device application, an augmented reality application, a mobile device application, a motion graphics application, a heads-up representations, a gaming application, etc. and the consumer may interact with the image and/or the application to request the verification of the validation of the image.

In some cases, to validate an image, an organization may provide certain information (such as source information, organization information, subject information, or any other information) to an image validation system. Based on the information provided by the organization, the image validation system may validate the image provided by the organization (e.g., verify that the image does in fact represent what the organization says that it does, verify that the image is an original image, verify that the image is produced or published by the organization, etc.). The image validation system may validate the image by comparing the image to other validated images and/or by comparing data associated with the image to trusted data. In validating the image, the image validation system may determine that a validation indication can be associated with the image to indicate that the image has been validated. Further, particular characteristics (e.g., the placement, presence, visibility, color, size, nature, etc.) of the image may indicate the validity of the image. Further, the validation indication may identify the information associated with the image.

In some cases, however, the validation of the image (e.g., the validation of the image data) may be static and may not change even if an indication of the validation is copied and presented with a different image that is not validated and/or if the image is modified subsequent to the validation. For example, in traditional systems, the validation of the image may be limited to an initial validation. A validation system may receive the image and validate the image to generate a validated image. However, the validated image may be altered by a third party system. Therefore, an indicator of the validation may be displayed with a validated image that has been altered or copied and displayed with an image that has not been validated. Without additional information, users may be unable to verify whether the validation is accurate and up to date. Therefore, such a traditional system may prove unsatisfactory as the system may be unable to consistently and efficiently indicate whether the image is validated. Additionally, a computing device may be unable to manually validate the image as the computing device may not obtain the original image.

To address these issues, the validity of an image can be verified. The validity of the image can be verified using a multi-layer verification process (e.g., a multi-phase verification process, a multi-level verification process). Each layer of the multi-layer verification process may include an additional level of security and verification of the validation of an image. The multi-layer verification process may include verification of a validation of an image based on a hash of an array representing an image and/or a hash of a shifted array representing the image, verification of a digital certificate associated with a source of the image, verification of a digital signature associated with a source of the image, verification of metadata associated with the image, etc. Therefore, the security and verification of the validation of the image can be increased relative to image validation by traditional computing systems.

A publisher computing device (e.g., a source of the image) may provide the image for validation. To enable the validation of the image, the publisher computing device may also provide a digital certificate that indicates the identity of an entity associated with the publisher computing device. The publisher computing device may receive the digital certificate from a certificate authority computing system. The certificate authority computing system may provide the digital certificate to the publisher computing device based on verifying an identity (e.g., a company, organization, business, person, etc.) associated with the publisher computing device. The digital certificate may identify the identity verified by the certificate authority computing system.

To validate the image, the publisher computing device may provide the image and the digital certificate associated with the publisher computing device to a computing system (e.g., the certificate authority computing system, a consumer computing device, etc.). Based on determining that the digital certificate is valid and identifies an identity associated with the publisher computing device, the computing system can determine that the image is a valid image. Based on determining that the image is valid, the computing system can generate the validated image. To generate the validated image, the computing system can embed the image with a digitally signed token for display via an application.

The application may be any computer application that is executable by a computing device, such as a microprocessor. For example, the application may be a website, a computer program, a mobile device application, virtual reality application, a medical device application, an augmented reality application, a mobile device application, a motion graphics application, a heads-up representations, a gaming application, video or audio data, all or a portion of an operating system, virtual machine, container, pod, etc. In certain cases, such as where the application is a computer application, the application may include source code or object code that when executed implements the computer program, operating system, or the like. In certain cases, the application may be an electronic message, such as an email, short message service ("SMS"), social media post or message, etc.

The digitally signed token may include metadata associated with an image (e.g., a title, a caption, a source, a location, a time of capture, etc.), the digital certificate, and a hash of the image (e.g., a hash of a modified portion of the image). To generate the hash of the image, the computing system can obtain an array of numbers corresponding to subpixels of the image (e.g., an array of 8-bit unsigned integers). For example, all or a portion of the 8-bit unsigned integers of the array of 8-bit unsigned integers may identify a value between 0 and 255 (e.g., a value identifying a Red, Green, or Blue color value for a particular pixel). Further, an 8-bit unsigned integer ma identify a Blue color value for a particular pixel.

In some embodiments, the computing system may shift all or a portion of the numbers by a particular number of positions. For example, the computing system may shift all or a portion of the 8-bit unsigned integers of an array of 8-bit unsigned integers by one position to the right within the array. Therefore, the computing system may generate a shifted array.

The computing system may hash the array of numbers using a hashing algorithm. For example, the computing system may hash the array of numbers using a secure hashing algorithm ("SHA") (e.g., SHA-256). In some embodiments, the computing system may hash the shifted array. By hashing the shifted array, the computing system may provide an additional layer of verification of the validation of the image. For example, the hash of the shifted array may be used to further confirm the validation of the image. Therefore, the computing system can store the hash, the digital certificate, and the metadata associated with the image in a token (e.g., as a string of values). For example, the computing system can store the hash, the digital certificate, and the metadata in a JavaScript Object Notation ("JSON") web token.

The computing system may sign the token and/or the image with a private key. The computing system can sign the token and/or the image with the private key to generate a digital signature and can add the digital signature to the token to generate a signed token. For example, the computing system may sign the token with a private key associated with the publisher computing device. By signing the token with the private key, the computing system can generate a digital signature that indicates that the token (and the image) are associated with the publisher computing device and verifies the token.

The computing system can embed the signed token in the image. For example, the computing system can embed the signed token in the image using steganography (e.g., Least Significant Bit ("LSB") steganography). To embed the signed token in the image, the computing system can convert the signed token into a string of numbers. For example, the computing system can convert the signed token into a string of 8-bit numbers. The computing system may convert a signed token of x characters (where x can be any number) into x 8-bit numbers. For example, the signed token may include a string of characters that includes letters, symbols, and/or numbers (e.g., the signed token may include "AFWEFA124312!@#"). The computing system may convert the signed token into a string of x 8-bit numbers corresponding to the string of characters using a conversion code. For example, the computing system may use American Standard Code for Information Interchange ("ASCII") computer code to convert all or a portion of the characters into an 8-bit number.

The computing system may embed an identifier of the length of the signed token (e.g., the length of x 8-bit numbers) in the image. For example, the computing system may identify a length of a signed token with 10 8-bit numbers as a length of 80-bits. The computing system can embed an identifier of the length of the signed token in a portion of the image. For example, the computing system can embed an identifier of the length of the signed token in the least significant bits of the first 32 bytes of the image (e.g., one or more least significant bits of each of the first 32 bytes). The computing system may modify all or a portion of the least significant bits by +1 or −1 such that the value of all or a portion of the bytes changes by a value between 0 and 1 if one least significant bit of all or a portion of the bytes is used to embed the length, a value between 0 and 3 if two least significant bits of all or a portion of the bytes are used to embed the length, etc. Therefore, the least significant bits of the first 32 bytes of the image can indicate the length of the signed token. A computing device obtaining the signed token can determine a length of the signed token and determine how to obtain the signed token from the image (e.g., by determining the portion of the image in which the signed token is embedded).

The computing system can embed the signed token in x*8 bytes after the first 32 bytes of the image, where x is the number of characters of the signed token. For example, where the signed token is 5 characters, the computing system can embed the signed token in the first 40 bytes after the first 32 bytes of the image (e.g., bytes 33-72 of the image). The computing system can embed the signed token in the least significant bits of the x*8 bytes of the image after the first 32 bytes of the image. For example, the computing system can change the least significant bit, the two least significant bits, etc. of the image to match a corresponding bit of the x 8-bit numbers associated with the hash. Therefore, the computing system may embed an identifier of the length of the signed token and the signed token in the first 32+8*x bytes of the image to generate the validated image. As embedding the identifier and the signed token may modify all or a portion of a group of sub-pixels by +1, −1, or 0 (if one least significant bit of all or a portion of the bytes is used to store the signed token), the validated image and the image may be visually similar (e.g., the validated image and the image may include minor differences that may not be perceivable by the human eye when comparing the validated image and the image at a particular distance).

The computing system can provide the validated image to the publisher computing device. The publisher computing device may provide the validated image to one or more consumer computing devices. In some cases, the one or more consumer computing device can display the validated image on the application (e.g., on a website or email message) or on a display of an application or computing device (e.g., on a splash screen when a computer or medical device is booted up or when a computer application is identified for execution). In some examples herein, specific reference is made to a validated image being displayed on a website or webpage, however, it will be understood that the validated image can be used in a variety of applications, including, but not limited to, computer software programs, mobile device applications, operating system, electronic message, etc.

The computing system can provide computer-executable instructions with the validated image, the computer-executable instructions may cause the verification of the validated image. In some embodiments, the computer-executable instructions may be provided separately from the validated image. The computer-executable instructions may cause an extension, an application, a program, etc. to be implemented for verification of a validation of a particular image. For example, the application may receive a request from a user computing device (e.g., by interacting with an image or the application) to verify whether a particular image is validated or not validated and may route the image to the computing system.

To verify the validation of the image (or the non-validation of the image), based on the implementation of the computer-executable instructions, the computing system (or a separate computing system such as the user computing device) can obtain the image. The computing system can decode the image (e.g., the first 32 bytes) of to determine a length of the signed token. The computing system can decode the image by inspecting the least significant bits of the image (e.g., a portion of the image such as the first 32 bytes of the image) to determine the length of the signed token. Based on the length of the signed token identified as x (e.g., bits), the computing system can further decode the image to identify an array of bytes. For example, the computing system can decode the image by inspecting the least significant bits of a subsequent x bytes of the image (e.g., x bytes after the first 32 bytes of the image) to identify the array of bytes. The computing system can convert the array of bytes into an array of values (e.g., an array of 8-bit numbers). In some embodiments, the computing system can further convert the array of values into an array of characters (e.g., Unicode Transformation Format-8-bit characters) that represent the signed token. Therefore, the computing system can identify the signed token.

Based on identifying the signed token, the computing system can obtain the digital certificate, the metadata, and the hash from the signed token. To verify the validation of the image, the computing system can perform a multi-stage verification process.

In a first stage of the multi-stage verification process, the computing system can verify the hash. To verify the hash, the computing system can compare the hash from the signed token with a hash from a blockchain. For example, the computing system can obtain the hash from the blockchain based on the metadata. In some embodiments, to verify the hash, the computing system can obtain an updated hash by hashing a shifted array corresponding to the image. The computing system can compare the hash from the signed token with the updated hash.

In a second stage, the computing system can verify the digital certificate using certificate validation. For example, the computing system may verify a digital signature of the digital certificate based on a certificate authority associated with the digital certificate, verify a validity date, policy, key usage, etc. associated with the digital certificate, and/or verify that the digital certificate has not been revoked (e.g., using a certificate revocation list, an online certificate status protocol responder, etc.). In some embodiments, the computing system may verify all or a portion of the digital certificates in a chain of digital certificates from the certificate authority to the digital certificate.

In a third stage, the computing system can verify the digital signature from the signed token. The computing system can use a public key (e.g., a public key associated with the publisher computing device) to verify that the digital signature is valid and associated with a particular computing device (e.g., the publisher computing device). The computing system can use the public key to decrypt the digital signature and can compare the decrypted digital signature to determine if the decrypted digital signature matches the token or the image. It will be understood that the multi-stage verification process may include more, less, or different stages. If the computing system determines that one or more stages of the multi-stage verification process have not been satisfied, the computing system may determine the image is not validated (or that the computing system is unable to verify the validation of the image). If the computing system determines that all or a portion of the stages of the multi-stage verification process have been satisfied, the computing system may verify the validation of the image.

To improve the comprehension of accuracy, security, and/or trustworthiness associated with an image, it can be advantageous to provide an indication of the verification or non-verification of the validation of an image. The execution of the computer-executable instructions may cause display, on the user computing device, of an indication of the verification (or the non-verification) along with the metadata associated with the image. The indication can indicate a level of trust that should be associated with a particular image. For example, the indication can display information associated with particular validations associated with the image. For example, the indication may provide additional information such as passed or failed verification stages. The use of such an indication provides additional security and validation that additional security and identity challenges have been satisfied. This provides an increased comprehension, for a consumer of an image, of the validity and trustworthiness of an image.

In light of the description above, it will be understood that the embodiments disclosed herein substantially increase Internet security, network security, and data reliability. Specifically, the embodiments disclosed herein enable a system to generate, use, display, and update a validated image. The embodiments disclosed herein enable a system to verify, in real-time, the validation of the validated image.

The ability to generate, use, display, and update a validated image and enable a system to verify, in real-time, the validation of the validated image enables the underlying network systems to more efficiently communicate in a trusted manner, thereby reducing illicit behavior on the Internet. Specifically, the validated image and the real-time validation of the validated image can provide a user and underlying computer systems real-time information regarding whether the validated image has been validated. The user can verify that the validated image has been validated in real-time based on the real-time information. In some embodiments, the system can provide a user and underlying computer systems non-real-time (e.g., periodic or asynchronous) information regarding whether a validated image has been validated. Thus, the presently disclosed embodiments represent an improvement in the functioning of Internet and network communications, as well as image security. Moreover, the presently disclosed embodiments address technical problems inherent within the Internet and network systems in the area of disinformation where it can be difficult to determine whether data is accurate and/or a level of trustworthiness of the data; specifically, how to determine whether an image has been validated and how to indicate that an image has been invalidated. These technical problems are addressed by the various technical solutions described herein, including the generation of computer-executable instructions that enable the real-time verification of a validation of an image. Thus, the present application represents a substantial improvement on existing network security, Internet security, and image security in general.

FIG. 1 depicts an example image validation environment 100 including an image validation system 104 by which the validated image can be provided. The image validation system 104 can communicate with a client computing device 102 over a network 112. Further, the image validation system 104 and/or the client computing device 102 can communicate with a certificate authority system 106, a third party system 108, and/or an administration system 110 over the network 112. The image validation system 104 can include a verification system 272. Using the verification system 272, the image validation system 104 can generate a validate image and provide the validated image to the third party system 108 and/or client computing device 102 via the network 112.

The verification system 272 can obtain a signed token and generate a validated image by embedding the signed token in an image. The verification system 272 may generate the validated image in response to receiving a request to validate an image from the third party system 108 (e.g., via the network). For example, the third party system 108 may provide the image to the image validation system 104 for validation. The third party system 108 be a computing system associated with an image data source (e.g., a publisher computing system). For example, the third party system 108 may provide images to consumers.

To verify an identify associated with the third party system 108, the third party system 108 can provide a digital certificate associated with the third party system 108 to the image validation system 104. The third party system 108 may obtain the digital certificate from the certificate authority system 106. To obtain the digital certificate from the certificate authority system 106, the third party system 108 may provide an indication of the identity associated with the third party system 108. For example, the third party system 108 may provide an indication of a website, an address, a telephone number, or other identifying information associated with the identity to the certificate authority system 106. Based on receiving the indication of the identity, the certificate authority system 106 may generate and provide a digital certificate (associated with the identity to the third party system 108).

The image validation system 104 may receive the image and the digital certificate from the third party system 108. The verification system 272 may use the digital certificate to validate the image (e.g., to validate that the image is associated with the third party system 108). Based on validating the image, the verification system 272 may generate the validated image by embedding a signed token in the image. The signed token may include a hash of at least a portion of the image, metadata associated with the image and/or the third party system 108, and/or the digital certificate. In some embodiments, the signed token may include a hash of a modified portion of the image (e.g., a shifted portion of the image). Therefore, the image validation system 104 can provide the validated image to the third party system 108, the administration system 110, and/or the client computing device 102.

The image validation system 104 and/or the verification system 272 may generate computer-executable instructions for verification of the validation of a particular image. The image validation system 104 can provide the computer-executable instructions to the third party system 108, the administration system 110, and or the client computing device 102. Based on the image validation system 104 providing the validated image and the computer executable instructions, the client computing device 102 may display the validated image. The modifications to the image to generate the validated image may be on a pixel by pixel basis and may not be identifiable using a human eye. For example, the human eye may be unable to spot a difference between the image and the validated image. In some cases, the image may be displayed with an identifier identifying that the image has been validated.

The client computing device 102 (or a separate computing device) may identify an interaction with the validated image. For example, the client computing device 102 can click on, hover over, determine a user is making eye contact with the image, or otherwise identify an interaction with the validated image. Based on identifying the interaction, the client computing device 102 can automatically and in real-time verify the validation of an image. The client computing device 102 may verify the validation of the image by implementing the computer-executable instructions.

The implementation of the computer-executable instructions may cause a program (e.g., an application, an extension, etc.) to be implemented for verification of the validation of the image (e.g., the client computing device 102 may implement the program). In some embodiments, one or more of the image validation system 104, the certificate authority system 106, the third party system 108, and/or the administration system 110 may implement the program. The program may verify the validation of the image via a multi-stage verification process. For example, the program may verify a hash of the signed token of the image, a digital certificate of the signed token of the image, and/or a digital signature associated with the signed token of the image. Based on verifying (or not verifying) the validation of the image, the client computing device 102 can display an indication of the verification (or non-verification) of the validation of the image. In some embodiments, the client computing device 102 may display the metadata.

The client computing device 102 may include one or more servers to provide computing capacity to users for building and hosting their software systems. Users can use the servers to launch and host different computing environments. Each computing environment can have various configurations of processing power, memory, storage, and networking capacity depending upon user needs. A user may use the client computing device 102 to access the network 112 (e.g., the Internet). The client computing device 102 may request a given application from the administration system 110 and upon receiving code corresponding to the application, cause the application to be presented to the user.

The image validation system 104 can be implemented as one or more computing devices, such as one or more servers (such as a cluster of servers on the cloud), virtual machines, containers, a gateway, etc. The image validation system 104 can be located remotely from or locally to the client computing device 102, the certificate authority system 106, the administration system 110, and/or the third party system 108. In some embodiments, the image validation system 104 is a trusted entity that can validate images using digital certificates. For example, the image validation system 104 may be or may be associated with the certificate authority system 106.

The image validation system 104 may periodically revalidate images. The image validation system 104 may periodically revalidate the images by identifying updated digital certificates associated with the third party system 108 and/or by periodically confirming the validity of the digital certificates.

The certificate authority system 106 can be implemented as one or more computing devices, such as one or more servers (such as a proxy server or a cluster of servers on the cloud) virtual machines, containers, a gateway, etc. The certificate authority system 106 can be located remotely from or locally to the client computing device 102, the certificate authority system 106, the third party system 108, the administration system 110, and/or the image validation system 104. The certificate authority system 106 may perform various functions including, but not limited to, generating digital certificates for an entity based on verifying the identity of the entity.

The third party system 108 can be implemented as one or more computing devices, such as one or more servers (such as a proxy server or a cluster of servers on the cloud) virtual machines, containers, a gateway, etc. The third party system 108 can be located remotely from or locally to the client computing device 102, the certificate authority system 106, the administration system 110, and/or the image validation system 104. The third party system 108 may perform various functions including, but not limited to, providing generating images, providing images to customers, and the like.

The administration system 110 can be implemented as one or more computing devices, such as one or more servers (such as a proxy server or a cluster of servers on the cloud), virtual machines, containers, a gateway, etc. The administration system 110 may communicate with one or more of the image validation system 104, the certificate authority system 106, and/or the third party system 108 to obtain certain information for presentation to a user via a user interface associated with the client computing device. For example, the administration system 110 may obtain validated image code from a third party system 108 and computer-executable instructions for verification of a validated image from the third party system 108 and/or the image validation system 104. The validated image code may be associated with or embedded into application code, such that when the application code is executed the image is displayed in the user interface.

As illustrated in FIG. 1, the client computing device 102, the image validation system 104, the certificate authority system 106, the third party system 108, and the administration system 110 can communicate over the network 112. The network 112 can include any appropriate network, including an intranet, the Internet, a cellular network, a local area network or any other such network or combination thereof. In the illustrated embodiment, the network 112 is the Internet. Protocols and components for communicating via the Internet or any of the other aforementioned types of communication networks are known to those skilled in the art of computer communications and thus, need not be described in more detail herein. The client computing device 102 may include user computing devices that can include any network-equipped computing device, for example desktop computers, laptops, smartphones, tablets, e-readers, gaming consoles, and the like. Users can access the image validation environment 100 via the network 112 to view or manage their data and computing resources, as well as to use applications.

Figure 2:
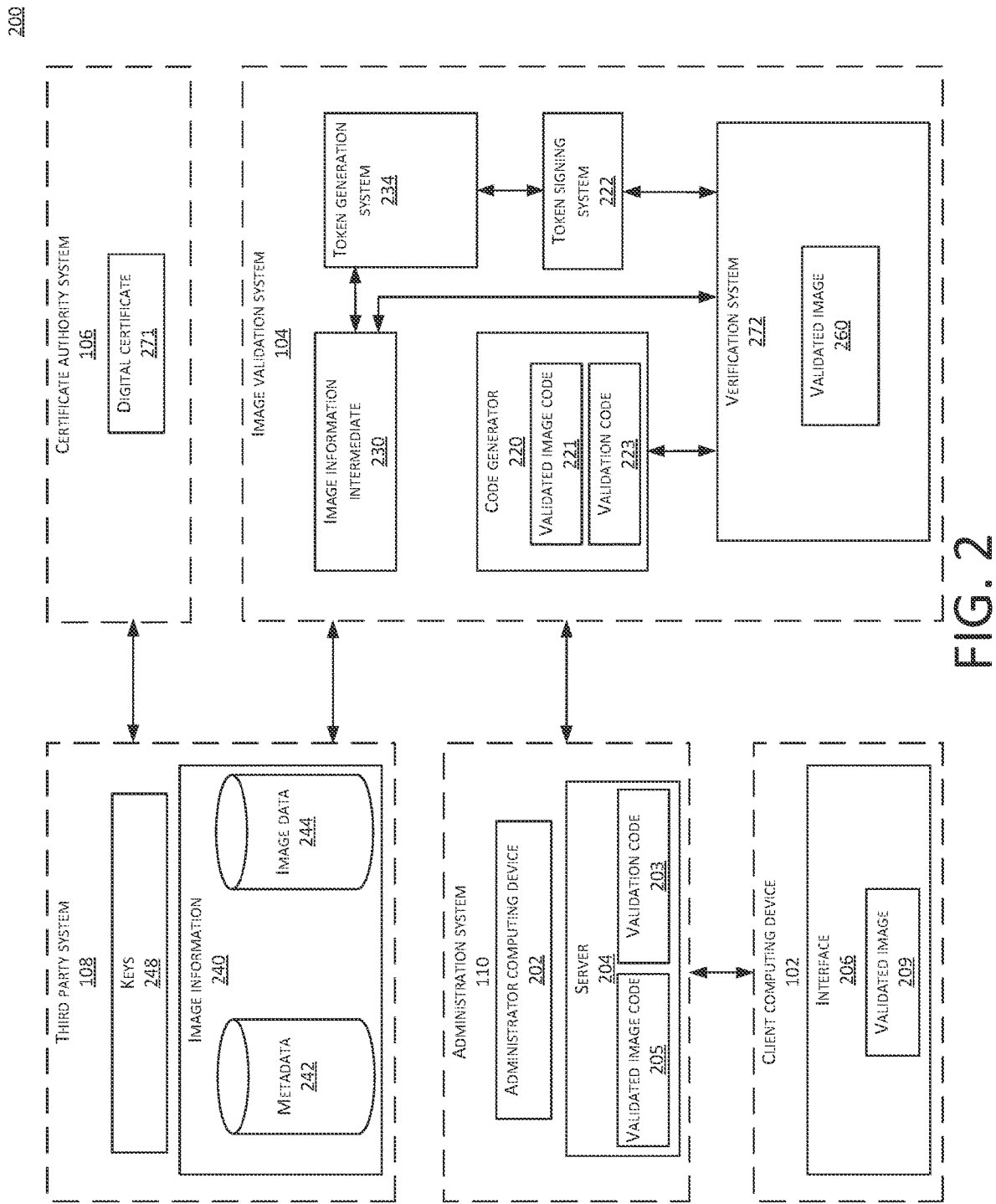
FIG. 2 depicts a schematic diagram of an example networked environment according to some embodiments.

FIG. 2 is a block diagram illustrating an embodiment of various computing systems in an image validation environment 200. In the illustrated embodiment, the environment 200 includes an administrator computing device 202, validation code 203, a server 204 (e.g., an http server), validated image code 205, a user interface 206, a validated image 209, a code generator 220 (also referred to herein as a validated image code generator 220), validated image code 221, a token signing system 222, validation code 223, an image information intermediate 230, a token generation system 234, image information 240 (including metadata 242 and image data 244), keys 248, validated image 260, digital certificate 271, and a verification system 272.

The client computing device 102 may include one or more of the interface 206 and the validated image 209 In some embodiments, the client computing device 102 may include more, less, or different components.

The image validation system 104 may include one or more of the code generator 220, the token signing system 222, the image information intermediate 230, the token generation system 234, and/or the verification system 272. In some embodiments, the image validation system 104 may include more, less, or different components. The verification system 272 of the image validation system 104 may include the validated image 260 and the code generator 220 may include one or more of the validated image code 221 or the validation code 223. In some embodiments, the verification system 272 and the code generator 220 may include more, less, or different components.

The certificate authority system 106 may include the digital certificate 271. In some embodiments, the certificate authority system 106 may include more, less, or different components.

The third party system 108 may include one or more of the keys 248 (e.g., public and/or private digital keys associated with the third party), the image information 240, the metadata 242, and/or the image data 244. In some embodiments, the third party system 108 may include more, less or different components.

The administration system 110 may include one or more of the administrator computing device 202, the server 204, the validated image code 205, and/or the validation code 203. In some embodiments, the administration system 110 may include more, less, or different components.

Any one or any combination of the components shown and described in FIG. 2 can each be implemented using one or more computing devices, such as, but not limited to one or more servers, processors, computing devices, virtual machines, etc., and communicate via a network to request an image, validate an image, display a validated image, and/or verify the validation of the validated (or a non-validated) image. The network can be a local area network (LAN) or wide area network (WAN), such as the Internet.

The code generator 220, the token signing system 222, the image information intermediate 230, the token generation system 234, and/or the verification system 272 may be distinct computing devices. In some embodiments, one or more operations performed by one or more of the code generator 220, the token signing system 222, the image information intermediate 230, the token generation system 234, and/or the verification system 272 may be performed by the same entity. For example, the token generation system 234 and the token signing system 222 may be the same computing device.

The image information 240 may be one or more databases storing image data (sensor data) and metadata associated with the image. The image information 240 may be information received from one or more image data sources (e.g., cameras, video cameras, computing devices, phones, sensors, etc.). In some embodiments, the image validation system 104 or the third party system 108 may receive the image information 240 directly or indirectly from an image data source. For example, the image validation system 104 may receive the image information 240 directly from a camera. In other embodiments, the third party system 108 may be the image data source.

The image data 244 may include data associated with an image of a scene captured by one or more image data sources (e.g., a camera). The image data may indicate one or more physical objects within a field of view of the image data source. The metadata 242 may include publicly or privately available information related to the image data 244. The metadata 242 may include information to identify the source of the image data 244 (e.g., the third party). For example, the metadata 242 can include publicly available information about the third party, such as the official name, domain names owned by, addresses, phone numbers, etc., of the third party. The metadata 242 may include identifying information associated with the image data 244. For example, the metadata may include a title of the image data 244, a caption of the image data 244, a label of the image data 244, a time and/or date of capture of the image data 244, or any other identifying information of the metadata 242. In some embodiments, the third party system 108 may generate and/or provide the metadata 242 associated with the image data 244.

The keys 248 may be a key pair associated with the third party system (or the image data source). For example, the keys 248 may include a public key and an associated private key.

The administration system 110, using the administrator computing device 202, can implement an application via the server 204 and the interface 206. In some embodiments, the administration system 110 may not implement the application via the server 204 and the interface 206. Instead, the administration system 110 can provide the application to the client computing device 102. The application and/or the administrator computing device 202 can be associated with an entity that desires to access an image, such as, but not limited to an entity that desires to access a news website that displays a validated image 209 and/or verify the validation of the validated image 209. In some embodiments, the validated image 209 may be for the application or for another computing system, domain name, application, code, entity, etc., associated with the administrator computing device 202.

To validate an identity associated with the image information 240 (e.g., an identity of the third party system 108, the image data source, etc.), the third party system 108 can request a digital certificate 271 from the certificate authority system 106. The third party system 108 may include in the request for the digital certificate a portion of the keys 248 (e.g., a public key) and identity information. The certificate authority system 106 (e.g., a validation device) may determine an identity, based on the identity information provided by the third party system 108, and issue the digital certificate 271 to the third party system 108. For example, the third party system 108 may provide identifying information including a name, a website, a phone number, a physical address, a device identifier (e.g., a MAC address, a processor identifier, a domain name, a device name, a customer identifier, etc.), a network address, etc. associated with the identity. Based on the provided information, the certificate authority system 106 can obtain (e.g., generate) a digital certificate that identifies the identity and a public key associated with the identity. Further, the digital certificate may include a digital signature of the certificate authority system 106.

The third party system 108 may obtain the digital certificate 271 from the certificate authority system 106. The third party system 108 may provide the digital certificate 271 and the image information 240 to the image validation system 104 for the generation of a validated image 260. In some embodiments, the third party system 108 may encrypt the image information 240 using a portion of the keys 248 (e.g., a private key).

The image validation system 104 may receive the image information 240 via an image information intermediate 230 and may validate the image information 240 received from the third party system 108 (e.g., using the image information intermediate 230). To validate the image information 240, the image validation system 104 may obtain the digital certificate 271 and obtain a public key from the digital certificate. The image validation system 104 may decrypt the image information 240 using the public key. In some embodiments, to validate the image information 240, instead of or in addition to decrypting the image information 240 using the public key, the image validation system 104 may validate that the identity associated with the digital certificate 271 is associated with the third party system 108 (or an image data source).

In some cases, the image validation system 104 may validate that the image information 240 is associated with a given entity. In some embodiments, the image validation system 104 may verify the image based on an analysis of the image information 240. For example, the image validation system 104 can verify the association based on a given trademark database (e.g., the United States ("US") trademark database), an industry standard such as Brand Indicators for Message Identification ("BIMI"), or any other manner of verifying an association of an image with an entity.

Based on validating the image information 240, the image validation system 104 may generate the validated image 260. The image information intermediate may route the image information 240 to the token generation system 234 for generation of a token (e.g., a JSON web token).

The token generation system 234 may receive the image information 240. The token generation system 234 may generate the token by embedding the metadata 242, a hash of a least a portion of the image data 244, and the digital certificate 271 in the image data 244 in a string of values. To generate the hash of the at least a portion of the image data 244, the token generation system 234 can convert the image data 244 into an array of values corresponding to subpixels of the image. In some embodiments, the image validation system 104 may receive the image data 244 as the array of values (e.g., an array of 8-bit unsigned integers). Each value of the array of values may indicate a respective Red, Green, or Blue color value for a particular sub-pixel.

The image validation system 104 may hash the array of values using a hashing algorithm. For example, the image validation system 104 may hash the array of values using SHA-256. In some embodiments, prior to hashing the array of values, the image validation system 104 may shift all or a portion of the values within the array of values by an amount. For example, the image validation system 104 may shift all or a portion of the values by one or more positions to the left or the right within the array of values. The image validation system 104 may hash the shifted array of values. In other embodiments, the image validation system 104 may hash an unshifted array of values. Hashing the shifted array may provide an additional layer of verification of the validation of the image as while a fraudulently validated image may include hash of at least a portion of the image, the fraudulently validated image may not include a hash of a shifted portion of the image (that is shifted in the same manner as the validated image. In some embodiments, the image validation system 104 may hash a particular portion of the array of values. In other embodiments, the image validation system 104 may hash the entire array of values. Therefore, the image validation system 104 can store (embed) the hash, the digital certificate, and the metadata associated with the image in the token (e.g., as a string of values).

In some cases, the image validation system 104 may also store the hash in a data store (e.g., a secure and/or trusted data store). The image validation system 104 may store the hash on a digital ledger using distributed ledger technology. For example, the image validation system 104 may store the hash within a data block of a blockchain (e.g., a private blockchain, a public blockchain, a permissioned blockchain, a consortium blockchain, etc.). One or more validators for the blockchain may validate the authenticity of the hash and add a block containing the hash to the blockchain. The image validation system 104 may store the hash in the data store with an identifier of the hash, the image data 244, a validated image 209, etc.

The token generation system 234 may provide the generated token to the token signing system 222. The token signing system 222 may sign the token with a private key. For example, the image validation system 104 may receive the private kay of the keys 248 and the token signing system 222 may sign the token using the private key. In some embodiments, the token signing system 222 may sign the token with a private key associated with the image validation system 104 or the token generation system 234.

The token signing system 222 can provide the signed token to the verification system 272. The verification system 272 may also receive the image information 240 from the image information intermediate. The verification system 272 can embed the signed token in the image data 244 of the image information 240. As discussed above, the verification system 272 may embed the signed token in the image data 244 using LSB steganography. To embed the signed token in the image data 244, the verification system 272 can embed a bit-length of the signed token (e.g., a length identifying a number of bits of the signed token) and the signed token in the image data 244. For example, the verification system 272 can convert the signed token into a string of numbers with a length of x (e.g., x-bits) where x can be any number, embed an identifier of the length of x in the image, and embed the string of numbers after the identifier of the length. The verification system 272 may embed the identifier of the length in a predetermined portion of the image data 244. For example, the verification system 272 may embed the identifier of the length in the least significant bits of the first 32 bytes of the image data 244 by modifying all or a portion of the least significant bits by +1 or −1 such that the least significant bits of the first 32 bytes of the image data 244 indicate the length of x (e.g., the length of the signed token). Therefore, the verification system 272 can embed the signed token in the image data 244 and generate a validated image 260.

The verification system 272 may be in communication with the code generator 220. The verification system 272 may provide the validated image 260 to the code generator 220. In response to receiving the validated image 260, the code generator 2220 can generate validated image code 221 that corresponds to the validated image 260 for display and validation code 223 to verify the validation of the validated image 260.

The code generator 220 may provide the validated image code 221 and the validation code 223 to the administrator computing device 202 for execution via a server 204 as validated image code 205 and validation code 203. For example, the code generator 220 may provide computer-executable code such that when the validated image code 221 and the validation code 223 are executed by a computing device (e.g., server 204), the validated image 209 is displayed (e.g., displayed on a given application). The validated image code 221 and the validation code 223 may cause the validated image 209 to be displayed with an identifier indicating that the validated image 209 has been validated. For example, the interface 206, when a user interaction is detected, may display an identifier indicating that the validated image 209 has been validated. In some cases, the identifier indicating that the validated image 209 has been validated may be displayed separately from the validated image 209.

The identifier indicating that the validated image 209 has been validated may include additional information associated with the validation process. For example, the identifier may indicate the third party system 108, the certificate authority system 106, the image validation system 104, a summary of the validation process, etc.

As noted above, based on the validated image code 221 and the validation code 223 generated by the code generator 220 and provided to the server 204, the validated image 209 may be displayed on application. In order to interact with the validated image 209, a user can interact with a domain uniform resource locator (URL) corresponding to the application which causes a server 204 to deploy the application.

In certain cases, the validated image code 221 and/or the validation code 223 may be dynamic and be updated periodically based on received information from the image validation system 104. The image validation system 104 may obtain updated information associated with the validated image 209 (e.g., an updated digital certificate 271).

Based on the new data being gathered, the validated image code 205 of the validated image 209 may be updated such that the validated image 209 as displayed on the server 204 is modified.

The validated image 209 may include multiple images. For example, the validated image 209 may include multiple images such that a display of the validated image 209 progresses from a first image to a second image, from the second image to a third image, etc. The image validation system 104 may separately validate all or a portion of the images. In some cases, the image validation system 104 may validate multiple images using the same digital certificate.

As part of providing a validated image 209 for a given application, the administration system 110 may embed the validated image code 205 and validation code 203, implemented as computer executable instructions, in an application that cause a validated image 209 be displayed on a display of a given application and/or client computing device 102 when executed. The administration system may the validated image code 205 and validation code 203 in the code of an application. The administrator computing device 202 may designate a server 204 associated with the application for which the validated image code 205 and validation code 203 associated with the validated image 209 should be provided. The server 204 may be the same server that is providing the code for a given application. In some embodiments, the application and the validated image 209 may be provisioned by separate servers. Upon verification of the entity, the validated image 209 may be provided to the server 204 such that the validated image code 205 and validation code 203 can be deployed by the administration system 110 to the client computing device 102.

Based on the deployment of the validated image code 205 and validation code 203 by the administration system 110 to the client computing device 102, an interface 206 associated with the client computing device 102 may display the validated image 209. In some cases, where the application is a website, a user navigating to the application via a computing device or any other device (e.g., by browsing to a URL and/or uniform resource identifier (URI) address associated with the application) may be provided the validated image 209 upon loading of the application. The server 204 may load the validated image code 205 and validation code 203 for execution as the application is loaded for display such that the validated image 209 is displayed simultaneously with the application. In some embodiments, the validated image 209 may be displayed after the application is loaded.

As described herein, the validated image 209 may be a dynamic image displayed on the client computing device 102 or a different computing device. The validated image 209 may be interactive. In some cases, the validated image 209 may be displayed on the client computing device 102 and the user may interact with the validated image 209 using an application (e.g., a software application). For example, the application may be a browser plugin or a browser extension. Therefore, the user may interact with the validated image 209 using the client computing device 102 and/or using a different computing device.

In some cases, the validation code 203 may detect user interactions. For example, the validation code 203 may detect the one or more user interactions via the client computing device 102. The one or more user interactions may include a user clicking on the validated image 209, scanning the validated image 209, hovering over the validated image 209, making eye contact (e.g., for a particular period of time) with the validated image 209, a user requesting the verification of the validation of the validated image 209 (e.g., orally, in written form, etc.). The validation code 203 may implement the verification process based on detecting the one or more user interactions. In some cases, the validation code 203 may not detect one or more user interactions and may implement the verification process periodically or aperiodically.

An interaction with the validated image 209 may initiate a verification process. For example, in response to the user interacting with the validated image 209, the client computing device 102 may transmit a request for verification of the validated image 209 to the image validation system 104. The request for verification of the validation of the validated image 209 may include an identifier of the validated image 209.

The image validation system 104 may receive the request for verification of the validation of the validated image 209. The image validation system may provide the identifier of the validated image 209 to the verification system 272. The verification system 272 may identify the validated image 209, the validated image code 205, validation code 203, or any other identifier of the validated image 209 associated with the request. The verification system 272 may parse a data store of the verification system 272 to identify an image associated with the request. Therefore, the image validation system 104 can identify the validated image 209 for verification of the validation of the image.

The verification system 272 can identify the validated image 209 and implement a multi-layer verification process. To implement the multi-layer verification process, the verification system 272 may decode the validated image 209 to determine if the validated image 209 has a signed token embedded within the validated image. For example, the verification system 272 may decode the validated image 209 by inspecting a portion of the image data corresponding to the image (e.g., the least significant bits of a particular number of bytes (e.g., the first 32 bytes) of the image). If the verification system 272 determines that the validated image 209 does not have a signed token embedded within the image, the verification system 272 may determine that the validated image 209 is not validated or that the validated image 209 cannot be verified.

If the verification system 272 determines that the validated image 209 does have a signed token embedded within the image, the verification system 272 determine the length of the signed token (e.g., based on inspecting the least significant bits of the first 32 bytes of the image). For example, the verification system 272 can identify values in all or a portion of the least significant bits of a portion of the image and identify a length indicated by the values.

Based on the length, the verification system 272 can identify a portion of the validated image 209 in which the signed token has been embedded. For example, the verification system 272 can determine that the length of the signed token is x (e.g., x characters) and can decode the validated image 209 by inspecting the least significant bits of a subsequent x bytes of the validated image 209 (e.g., x bytes after the first 32 bytes of the image (the first 32 bytes of the validated image 209 corresponding to the length of the signed token)) to identify an array of bytes. The verification system 272 can convert the array of bytes into an array of values (e.g., an array of 8-bit numbers, an array of characters (e.g., Unicode Transformation Format-8-bit characters)) that represent the signed token.

Based on identifying the signed token, the verification system 272 can obtain the digital certificate, the metadata 242, and the hash from the signed token. In some cases, the signed token may be encrypted using a private key. Prior to obtaining the digital certificate, the metadata 242, and the hash from the signed token, the verification system 272 may decrypt the signed token (e.g., using a public key). The verification system 272 may identify an entity associated with the validated image 209 and/or the signed token. Based on identifying the entity, the verification system 272 may identify a public key associated with the entity (e.g., stored in a data store of the verification system 272). The verification system 272 may decrypt the signed token using the public key. If the verification system 272 determines that a public key is not associated with the entity or the signed token cannot be decrypted, the verification system 272 may determine that the validated image 209 is not validated or that the validated image 209 cannot be verified.

The verification system 272 can obtain the hash from the signed token. The verification system 272 can verify the hash by comparing the hash from the signed token with another hash. For example, the verification system 272 may obtain the another hash from a data store (e.g., secure data storage such as a blockchain). For example, during or after generation of the hash for validation of the image data 244, the image validation system 104 may store the hash on the blockchain (e.g., with an identifier of the image data 244, the validated image 209, an entity associated with the image data 244). The verification system 272 can obtain the hash from the blockchain using an identifier of the image data 244, the validated image 209, an entity associated with the image data 244. Instead of comparing the hash from the signed token with a hash obtained from a blockchain or in addition to comparing the hash from the signed token with a hash obtained from a blockchain, the verification system 272 can obtain an updated hash by hashing the validated image 209 (e.g., a shifted portion of the validated image 209). The verification system 272 can compare the hash from the signed token with the updated hash. If the verification system 272 determines that the hash from the signed token does not match the hash stored in the data store and/or the updated hash, the verification system 272 may determine that the validated image 209 is not validated or that the validated image 209 cannot be verified.

As discussed above, the verification system 272 can also obtain the digital certificate 271 from the signed token. The verification system 272 may verify a signature of the digital certificate 271. For example, the verification system 272 may verify that the signature of the digital certificate corresponds to the certificate authority system 106 (or a group of certificate authority systems). Further, the verification system 272 may verify a validity date, policy, key usage, etc. associated with the digital certificate 271. In some cases, the verification system 272 may utilize an online certificate status protocol and/or a certificate revocation list (associated with the certificate authority system 106 or a group of certificate authority systems), and verify that the digital certificate 271 has not been revoked. The verification system 272 may also verify one or more digital certificates associated with the digital certificate 271. For example, the verification system 272 may verify all or a portion of the digital certificates in a chain of digital certificates that includes the digital certificate 271. The chain of digital certificates may include a plurality of digital certificates that link the certificate authority system 106 to the digital certificate 271. If the verification system 272 determines that the digital certificate 271 is not verified, the verification system 272 may determine that the validated image 209 is not validated or that the validated image 209 cannot be verified.

As discussed above, the verification system 272 can also identify a digital signature associated with the signed token. The verification system 272 can use the public key of the entity (e.g., the third party system 108) that is associated with the validated image 209 (as discussed above) to verify that the digital signature is valid and associated with the entity. If the verification system 272 determines that the digital signature is not verified, the verification system 272 may determine that the validated image 209 is not validated or that the validated image 209 cannot be verified.

If the verification system 272 determines that any of the verification layers or steps have not been satisfied, the verification system 272 may determine that the validated image 209 is not validated (or that the verification system 272 is unable to verify the validation of the validated image 209). If the verification system 272 determines that all or a portion of the layers or steps have been satisfied, the verification system 272 may verify the validation of the validated image 209.

The verification system 272, via the image validation system 104, may provide an indication to the computing device that interacted with the validated image 209. For example, the verification system 272 may indicate that the validated image 209 is or is not validated based on the multi-layer verification process, as discussed above. In some cases, the verification system 272 may indicate that the validated image 209 should be updated and/or may provide updated validated image code 205 to the administration system 110.

Presentation of the Validated Image

Figure 3A:
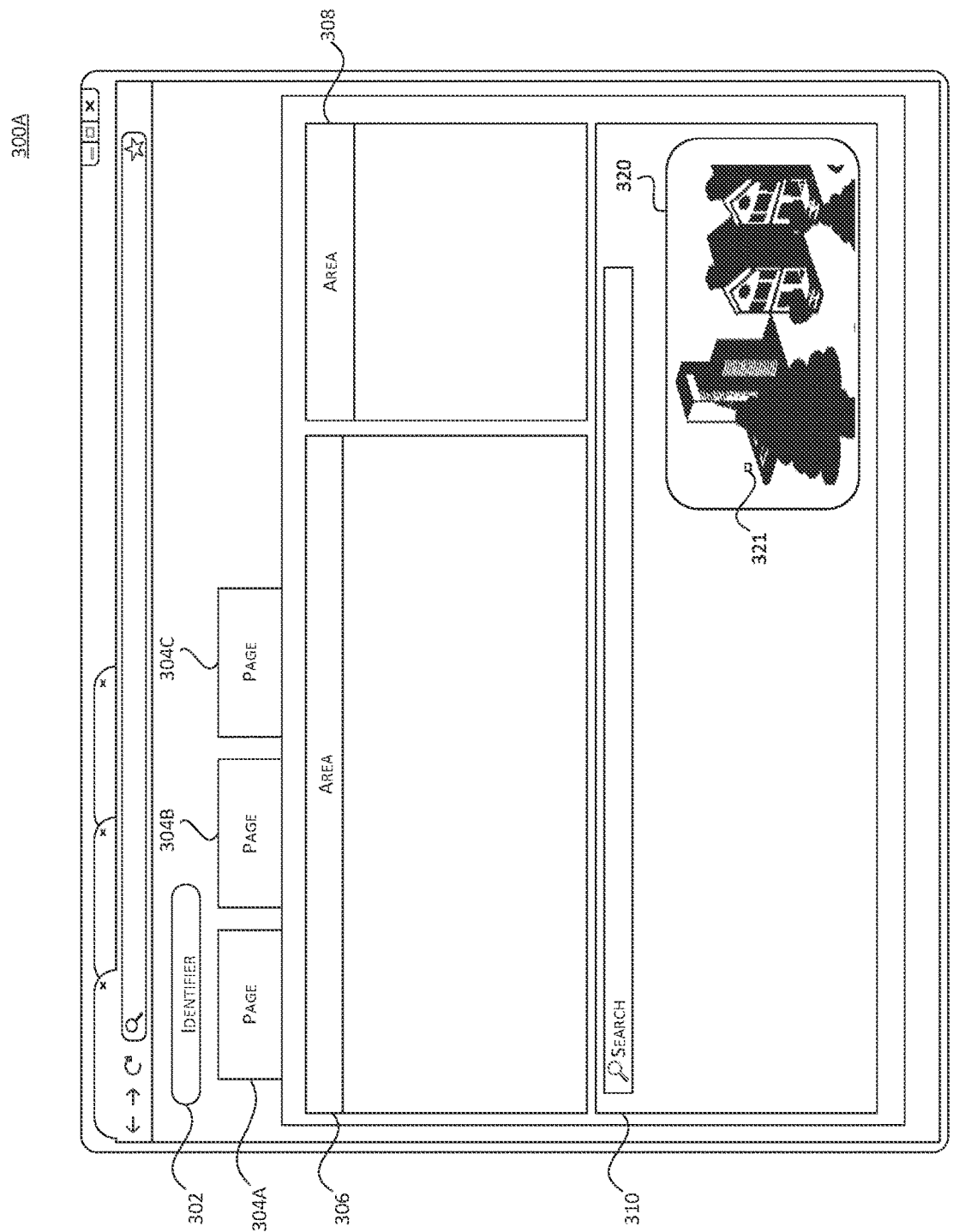
FIGS. 3A, 3B, 3C, and 3D depict a schematic diagram of an example image according to some embodiments.

FIG. 3A depicts an example user interface 300A for presenting an application and a validated image 320 for display for a user. Although described herein with reference to a website, it will be understood that the concepts described herein can be used in conjunction with a variety of applications including gaming applications, mobile device applications, motion graphics, heads-up representations, computer applications, operating systems, etc. The example user interface may be the interface 206 providing the website and the validated image 209 of FIG. 2. The example user interface 300A is illustrative of an interface that a server (e.g., the server 204) generates and presents to a user when interacting with the server. The server may receive information (e.g., code including the validated image code 205) from the image validation system 104 that the server can use to generate and present the interface to the user. In the example of FIG. 3A, the user interface 300A includes various components corresponding to the website and presented via the example user interface 300A. As will be described in more detail below, the components may include the validated image 320 embedded with a signed token 321. It will be understood that FIG. 3A is illustrative only, and a server, via the user interface and based on information from the image validation system 104, may present any number of validated images or types of validated images.

The user interface 300A may include an identifier 302. The identifier 302 may identify a particular website and provide information about the particular website represented in the user interface 300A. The identifier 302 may correspond to any numerical, alphabetical, alphanumerical, or symbolical string.

The user interface 300A may include a first page 304A, a second page 304B, and a third page 304C. By interacting with a control, a user can cause the user interface 300A to represent information about the first page 304A, the second page 304B, or the third page 304C. Further, the user interface 300A may include more, less, or different pages. Each of the first page 304A, the second page 304B, and the third page 304C can present one or more validated images. In some embodiments, one or more of the first page 304A, the second page 304B, or the third page 304C may present a different validated image or the same validated image.

The page 304A of the user interface 300A may include various areas including a first area 306, a second area 308, and a third area 310. The first area 306, the second area 308, and the third area 310 may include any information associated with the website and/or the entity. For example, the user interface 300A may correspond to a new website and the entity may correspond to a news organization. Each of the first area 306, the second area 308, and the third area 310 may correspond to information such as articles, information about the news organization, etc. The third area 310 of the user interface 300A may include a search area. The search area includes a search bar that the user can use to query a system for certain information. For example, where the user interface 300A corresponds to an interface of a news website, the search interface may allow the user to search for (and subsequently read or parse) certain articles. Each of the first area 306, the second area 308, and the third area 310 may allow the user to interact with the user interface 300A in a desired manner.

The user's interactions with the user interface 300A may be based on a level of trust that the user has with the website and/or the entity and content provided by the website and/or the entity. If the user does not have a high level of trust with any of the website or the entity, the user may be reluctant to interact with the user interface 300A. For example, if the user does not have a high level of trust with a news organization, the user may not trust articles and images that are published by the news organization. Further, the user may be reluctant to purchase content from the news organizations if the user does not trust the organization. Therefore, to provide an indication of a level of a trust that a user should have for a particular image on the website and/or the entity, the user interface 300A may include a validated image 320.

The validated image 320 may indicate a level of trust that should be associated with the validated image 320. The validated image 320 may correspond to a validation by a vetting entity (e.g., a certificate authority, an image validation system, etc.) that the image can be trusted. As the validated image 320 is provided by a vetting entity, a user can confirm that the validated image should be trusted.

To provide information about the level of trust that the user should have for a particular image, the user interface 300A may include a program (e.g., a browser plugin, an extension, etc.) that enables a user to verify a validation of a particular image. For example, the program can enable a user to verify that a first image has not been validated and the validated image 320 has been validated (based on a signed token 321 embedded in the validated image 320).

As discussed above, the validated image 320 may include a signed token 321 embedded within the validated image 320. The signed token 321 may include a hash of an image, a digital certificate, and/or metadata associated with the image. Further, the signed token 321 may include a digital signature. The program may verify, in real time, the validation of the validated image 320 using the signed token 321. For example, the program may verify all or a portion of the hash of the image, the digital certificate, the metadata, and/or the digital signature. Based on verifying the validation of the validated image 320, the interface 300A can display an indication of the verification. Therefore, the user interface 300A can verify the validation of the validated image (and verify that other images are not validated) and display an indication of the verification.

Indications of Verification of Validated Images

Figure 3B:
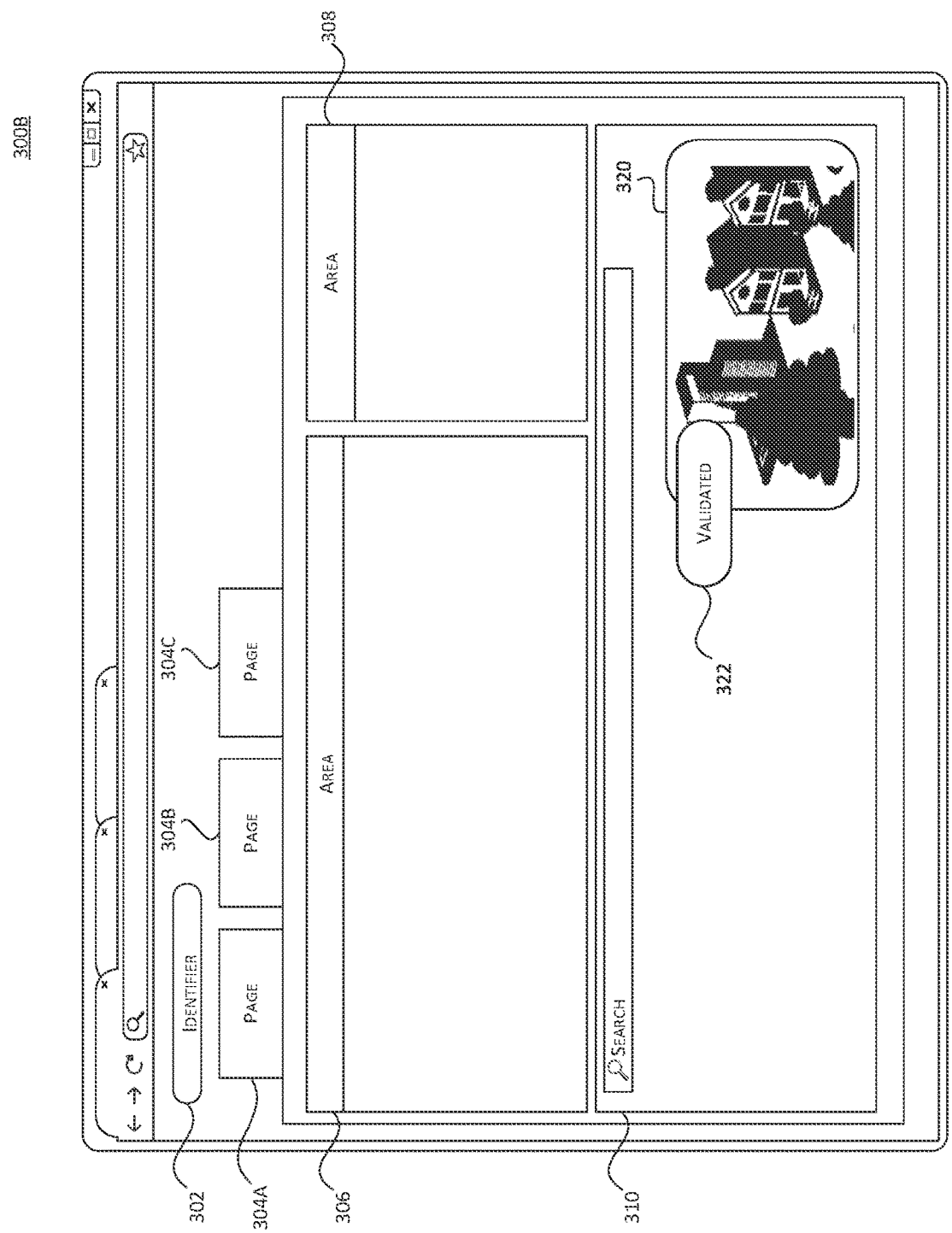
Figure 3C:
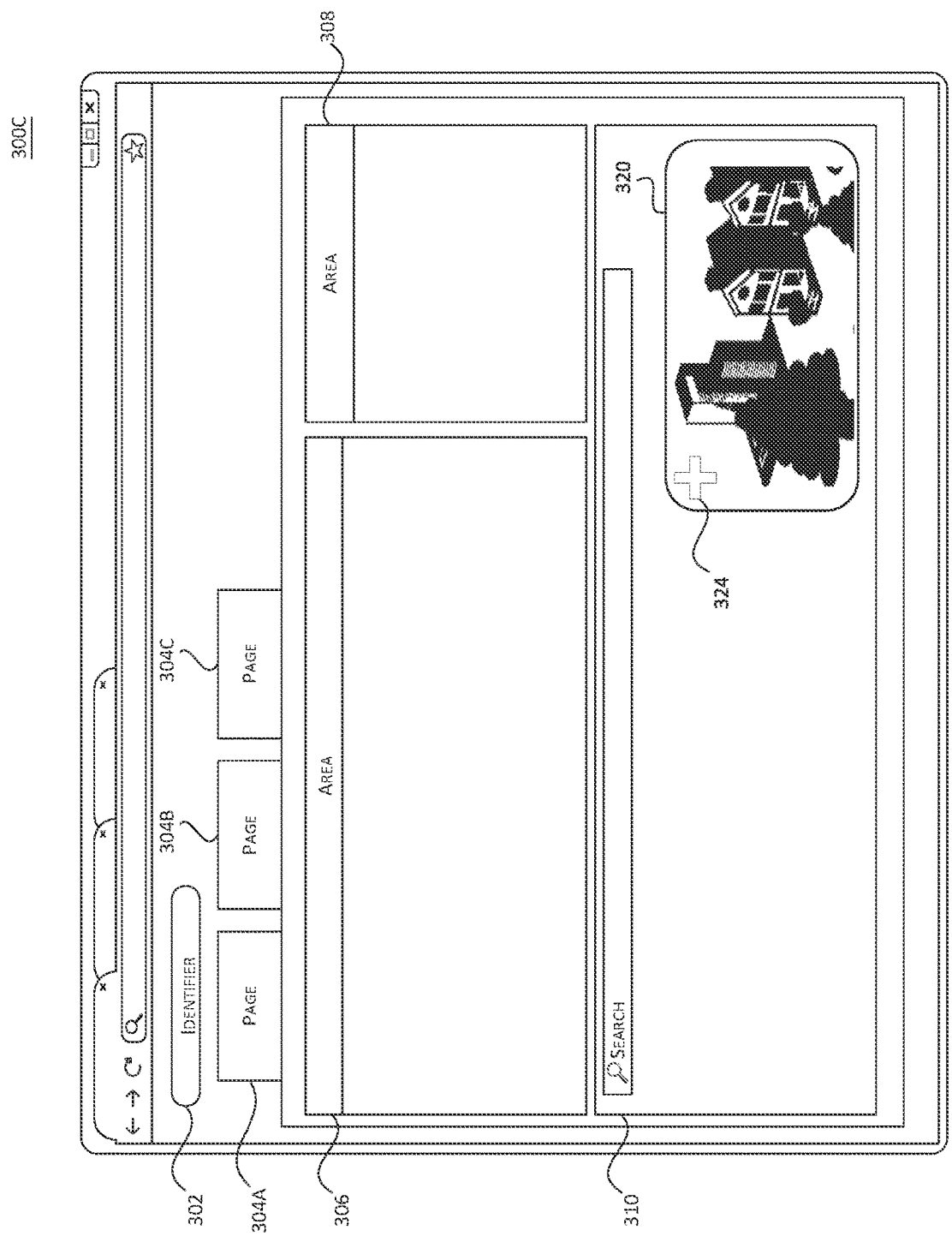
Figure 3D:
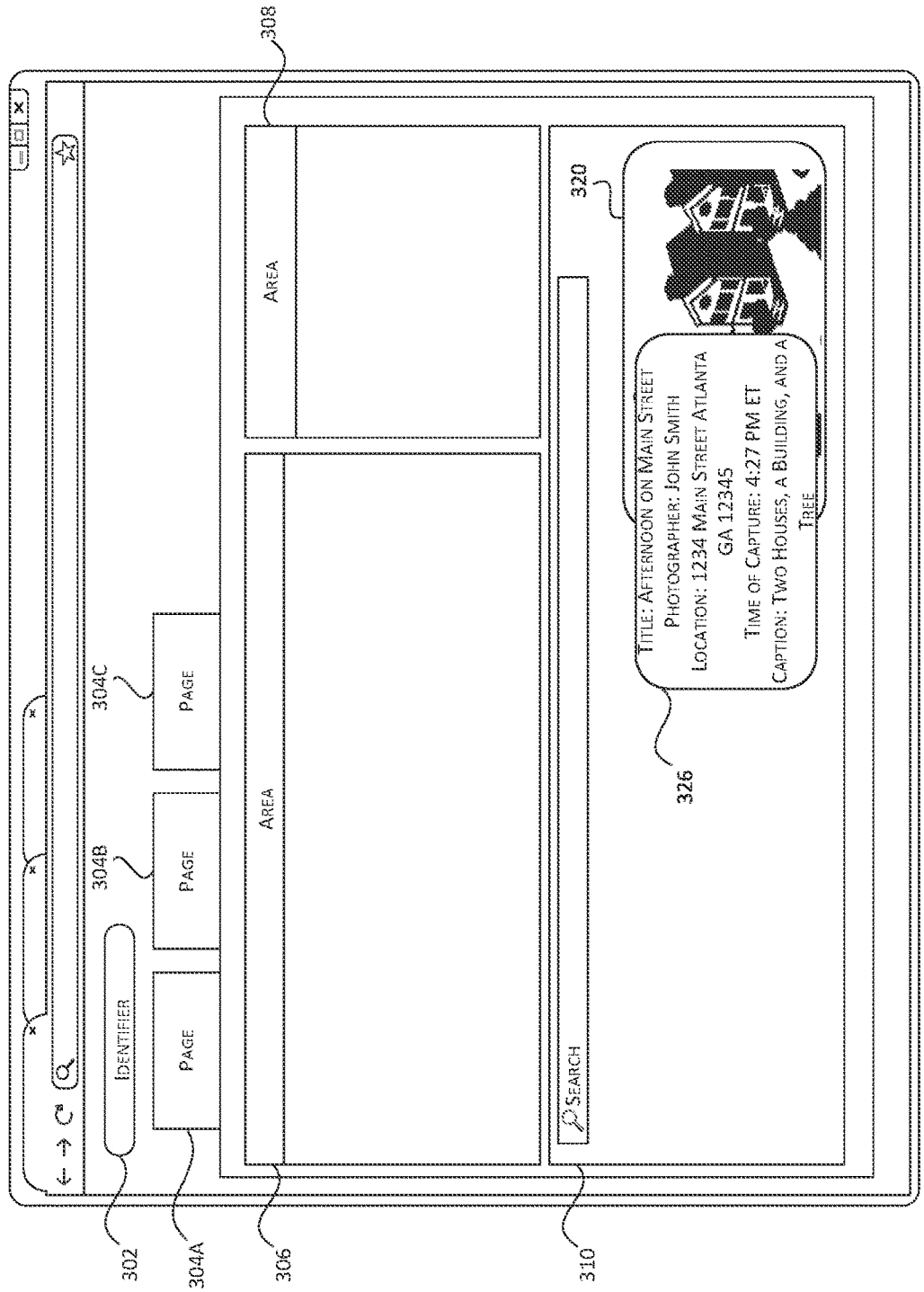

As noted above, an image can be validated to generate a validated image. The validated image can be displayed via a display of a user computing device. The validated image may be displayed with indications of a verification of the validity of the image. The validity of the image can be determined in real time in response to a user request for such a validation. The use of the indication of the verification enables a user to verify the authenticity and validity of an image included with an application. FIGS. 3B, 3C, and 3D each depict a validated image displayed with an indication of the verification of the validity of the validated image.

FIG. 3B depicts an example user interface 300B for presenting an application and a validated image 320 for display for a user. Although described herein with reference to a website, it will be understood that the concepts described herein can be used in conjunction with a variety of applications including gaming applications, mobile device applications, motion graphics, heads-up representations, computer applications, operating systems, etc. The example user interface 300B may include the interface 300A as discussed with reference to FIG. 3A. As discussed above, the user interface 300B may be the interface 206 providing the website and the validated image 209 of FIG. 2.

As discussed above, the user interface 300B may include an identifier 302, a first page 304A, a second page 304B, and a third page 304C. The page 304A of the user interface 300B may include various areas including a first area 306, a second area 308, and a third area 310. The first area 306, the second area 308, and the third area 310 may include any information associated with the website and/or the entity.

The user's interactions with the user interface 300B may be based on a level of trust that the user has with the website and/or the entity and content provided by the website and/or the entity. To determine the level of trust that should be associated with a validated image 320 displayed on the user interface 300B, the user may interact with the validated image 320 or the user interface 300B.

In response to the user's interactions with the validated image 320 and/or the user interface 300B, an image validation system may, in real time, verify the validity of the validated image 320. To verify the validity of the validated image 320, the image validation system may perform a multi-layer verification process. For example, the image validation system may verify within a signed token of the validated image 320, a digital certificate, metadata of the validated image 320, a hash of a portion of the image. Based on performing the multi-layer verification process, the image validation system may cause the user interface 300B to display an indication of the verification of the validation of the validated image 320.

In the example of FIG. 3B, the indication of the verification of the validation of the validated image 320 includes a verification section 322 displayed on the user interface 300B. The verification section 322 indicates that the validated image 320 is "validated." In some cases, the verification section 322 may indicate that a given image is "not validated" or was "unable to be validated." The verification section 322 may also indicate a time, date, verification source, etc. of the verification.

To provide an indication of a verification of the validation of a validated image, a user interface can include a symbolical, textual, numerical, or alpha-numerical representation. In some cases, the indication may include a symbolical indication that is updated in real time (e.g., as the validation of the validated image is verified). FIG. 3C depicts an example user interface 300C for presenting an application and a validated image 320 for display for a user. Although described herein with reference to a website, it will be understood that the concepts described herein can be used in conjunction with a variety of applications including gaming applications, mobile device applications, motion graphics, heads-up representations, computer applications, operating systems, etc. The example user interface 300C may include the interface 300A as discussed with reference to FIG. 3A. As discussed above, the user interface 300C may be the interface 206 providing the website and the validated image 209 of FIG. 2.

As discussed above, the user interface 300C may include an identifier 302, a first page 304A, a second page 304B, and a third page 304C. The page 304A of the user interface 300C may include various areas including a first area 306, a second area 308, and a third area 310. The first area 306, the second area 308, and the third area 310 may include any information associated with the website and/or the entity.

To indicate a level of trust that should be associated with a validated image 320 displayed on the user interface 300C, the validated image 320 may be displayed with an indication of a verification of a validation of the validated image 320. An image validation system may, periodically or aperiodically, in real time, verify the validity of the validated image 320. For example, the image validation system may verify the validity of the validated image 320 according to a predetermined verification schedule. In some cases, the image validation system may verify the validity of the validated image 320 in response to a prompt from a computing device. For example, the image validation system may determine that an image satisfies a threshold value (e.g., a 70% likelihood) for being altered or modified such that the image is no longer an accurate representation of a related image. The image validation system may determine that the image has a particular likelihood of being altered or modified based on a machine learning algorithm that identifies images that have likely been altered. In some embodiments, the image validation system may monitor a website (e.g., a social media platform) and determine a particular likelihood of the image being altered or modified. The image validation system may compare the particular likelihood to a threshold value (e.g., 75%) and may verify a validation of the validated image in response the particular likelihood to the threshold value (e.g., if the particular likelihood exceeds or satisfies the threshold value).

Based on verifying the validity of the validated image, the image validation system may cause the user interface to display an indication of the validity of the validated image 320. The image validation system may update the indication in real time as the image validation system verifies the validity of the validated image 320.

In the example of FIG. 3C, the indication of the verification of the validation of the validated image 320 includes a verification section 324 displayed on the user interface 300C. The verification section 324 indicates that the validated image 320 is validated based on the verification section 324 including a "+." In some cases, the verification section 324 may include a similar symbol, textual string, alphanumerical string, numerical string, etc. For example, the verification section 324 may include a "V" to indicate a verification of the validation of the validated image 320. In some cases, the verification section 324 may indicate that a given image is not validated or was unable to be validated based on the verification section 324 including a "−" or a similar symbol, textual string, alphanumerical string, numerical string, etc. The verification section 324 may also indicate a time, date, verification source, etc. of the verification.

Instead of or in addition to providing indication of a verification of the validation of a validated image, a user interface can provide metadata associated with a given image. In some cases, the metadata may be metadata received with the image data and embedded in the validated image. Further, the user interface may provide metadata in response to verifying the validity of the image. FIG. 3D depicts an example user interface 300D for presenting an application and a validated image 320 for display for a user. Although described herein with reference to a website, it will be understood that the concepts described herein can be used in conjunction with a variety of applications including gaming applications, mobile device applications, motion graphics, heads-up representations, computer applications, operating systems, etc. The example user interface 300D may include the interface 300A as discussed with reference to FIG. 3A. As discussed above, the user interface 300D may be the interface 206 providing the website and the validated image 209 of FIG. 2.

As discussed above, the user interface 300D may include an identifier 302, a first page 304A, a second page 304B, and a third page 304C. The page 304A of the user interface 300D may include various areas including a first area 306, a second area 308, and a third area 310. The first area 306, the second area 308, and the third area 310 may include any information associated with the website and/or the entity.

The validated image 320 may be displayed with a metadata section 326. The metadata section 326 may include metadata associated with the validated image 320. The metadata associated with the validated image 320 may include a title, a source, a caption, a time of capture, a data of capture, a location, subject(s), or any other identifying information associated with the validated image 320.

The user interface 300D may display the metadata section 326 in response to verifying the validation of the validated image 320. The metadata section 326 may include a section indicating a time, date, source, etc. of the validation of the validated image 320. In some embodiments, the user interface 300D may display a first section that indicates the verification of the validation of the validated image and a second section that includes the metadata section 326. The first and second sections may be displayed at the same time, but in different locations of the user interface 300D or the first and second sections may be displayed at different times (e.g., sequentially).

In some cases, the user interface 300D may display the metadata section 326 without verifying the validation of the validated image 320. The user interface 300D may include a section within the metadata section 326 indicating that the validation of the validated image 320 has not been verified.

The user interface 300D may display the metadata section 326 in response to a user interaction with the validated image 320 and/or the user interface 300D. For example, a user may click on the validated image 320 and the user interface 300D may display the metadata section 326.

In the example of FIG. 3D, the metadata section 326 identifies a title, a photographer, a location, a time of capture, and a caption of the validated image 320. The metadata section 326 identifies the title of the validated image 320 as "Afternoon on Main Street," the photographer of the validated image 320 as "John Smith," the location of the validated image 320 (e.g., the location where the validated image 320 was captured, the location where image data associated with the validated image 320 is stored, etc.) as "1234 Main Street Atlanta GA 12345," the time of capture of the validated image 320 as "4:27 PM ET," and the caption of the validated image 320 as "Two Houses, a Building, and a Tree."

Figure 4:
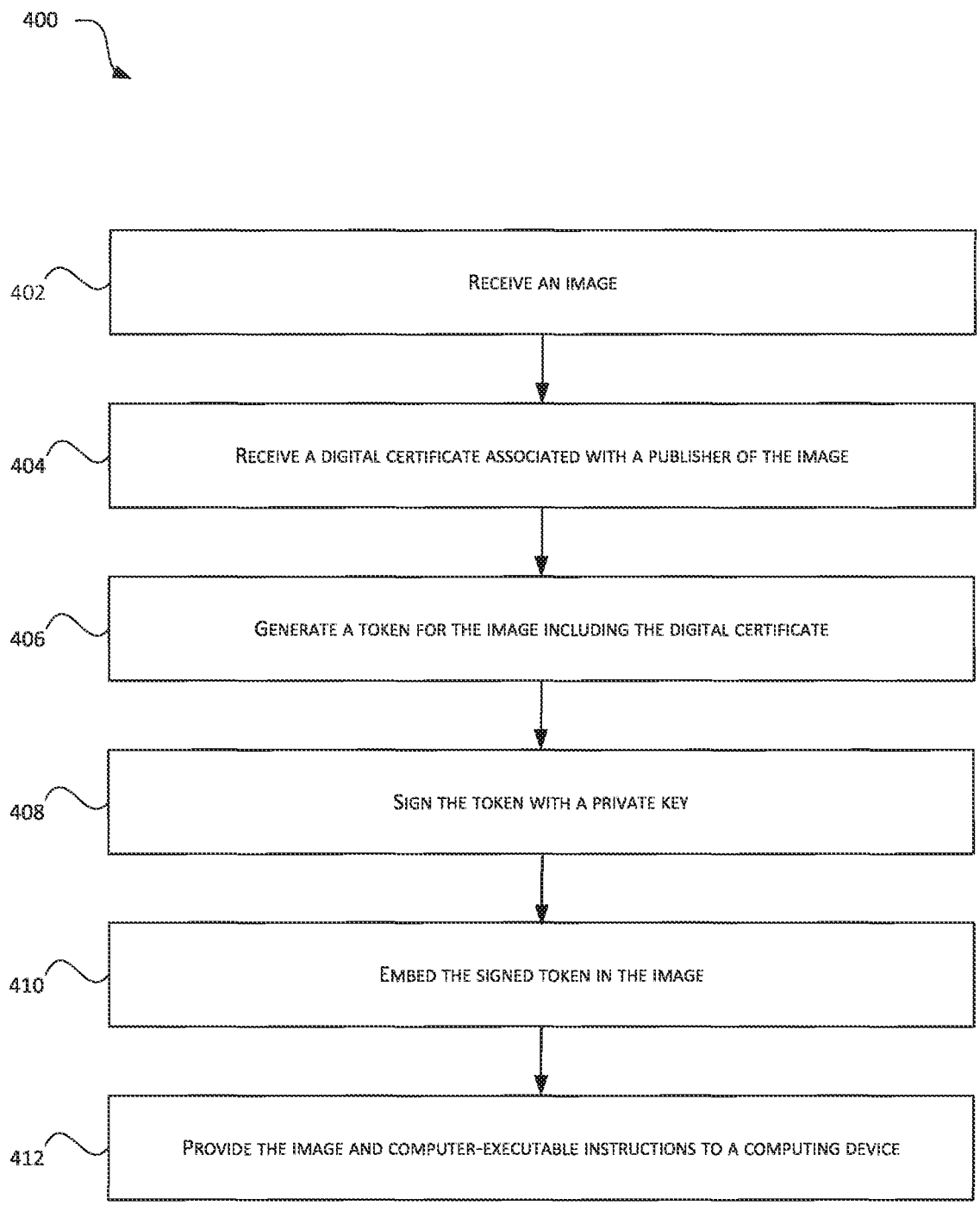
FIGS. 4, 5, and 6 are flowcharts of an example routine for causing display of a validated image.

FIG. 4 is a flow diagram illustrating an embodiment of a routine 400 implemented by an image validation system 104 to provide a validated image. Although described herein as being implemented by image validation system 104, it will be understood that any one or any combination of the steps described herein can be implemented by one or more components associated with the image validation system 104, such as, but not limited to, the code generator 220, the token signing system 222, the image information intermediate 230, the token generation system 234, and/or the verification system 272.

At block 402, the image validation system 104 receives an image. The image validation system 104 may receive the image and a request to generate a validated image. The image validation system 104 may receive the image from a publisher computing device associated with a publisher of the image.

At block 404, the image validation system 104 receives a digital certificate associated with a publisher of the image. For example, the image validation system 104 can receive the digital certificate from a publisher computing device, a certificate authority computing system, etc. The digital certificate may be issued by a certificate authority for the publisher computing device.

At block 406, the image validation system 104 generates a token for the image including the digital certificate. For example, the token may be a JSON web token. The token may include one or more of a hash of at least a portion of the image, the digital certificate, and the metadata associated with the image. The metadata associated with the image may include a title, a caption, a date, a source, a location, a time, etc. associated with the image. The hash of the at least a portion of the image may be a most significant bit hash of the at least a portion of the image.

In some cases, the image validation system 104 may generate the hash of the at least a portion of the image. For example, the image validation system 104 may generate the hash using a hashing algorithm (e.g., SHA-256). The image validation system 104 may generate a hash of the at least a portion of the image by obtaining an array of values that correspond to one or more pixels or subpixels of the image. The image validation system 104 may hash the array of values to generate the hash. In some cases, the image validation system 104 may shift the array of values prior to hashing the array of values. For example, the image validation system 104 may shift one or more values of the array of values to the left or right one or more places to generate a shifted array of values and may hash the shifted array of values to generate the hash.

In some cases, the image validation system 104 may store the hash of the at least a portion of the image. The image validation system 104 may store the hash of the at least a portion of the image in a data store of the image of the image validation system 104. In some cases, the image validation system 104 may store the hash of the at least a portion of the image on a blockchain. The image validation system 104 may store the hash of the at least a portion of the image with an identifier of the image, the publisher computing device, etc.

At block 408, the image validation system 104 signs the token with a private key. The image validation system 104 may sign the token by adding a digital signature to the image. To generate the digital signature, the image validation system 104 may encrypt the token, the image, etc. with a private key associated with the publisher. In some cases, the image validation system 104 may generate the digital signature by encrypting the token, the image, etc. with a private key associated with the image validation system 104.

In some cases, the image validation system 104 may not sign the token. For example, the image validation system 104 may generate the token and embed the token in the image.

At block 410, the image validation system 104 embeds the signed token in the image. The image validation system 104 may embed the signed token in the image using image steganography (e.g., least significant bit steganography). Based on the embedding the signed token in the image, the image validation system 104 can update the image.

At block 412, the image validation system 104 provides the image (e.g., embedded with the signed token) and computer-executable instructions to a computing device. The execution of the computer-executable instructions may cause a computing system (e.g., the computing device, the image validation system 104, or a separate computing system) to perform a multi-layer verification process. For example, the multi-layer verification process can include verifying the image based on the hash from the signed token, the hash of the least a portion of the image, the digital signature, the metadata, and/or digital certificate. In some embodiments, the execution of the computer-executable instructions may be in response to an interaction (e.g., a user interaction) with the image)

In a first layer of the multi-layer verification process, the computing system may verify the validity of the image by obtaining the hash of the at least a portion of the image. For example, the computing system may obtain the hash of the at least a portion of the image from a data store (e.g., the blockchain) or by hashing a portion of the received image. Further, the computing system can obtain the hash from the signed token. The computing system can compare the hash of the at least a portion of the image with the hash from the signed token. The computing system may verify the image if the hash of the at least a portion of the image matches the hash from the signed token.

In a second layer of the multi-layer verification process, the computing system may verify the validity of the image by validating the digital signature. The computing system may validate the digital signature using a public key (e.g., a public key associated with the publisher, the image validation system, etc.). The computing system may decrypt the digital signature using the public key to identify a decrypted token, a decrypted image, etc. The computing system can compare the decrypted token, the decrypted image, etc. with the signed token, the image, etc. to determine a verification of the validity of the image. The computing system may verify the image if the decrypted token, the decrypted image, etc. matches the signed token, the image, etc.

In a third layer of the multi-layer verification process, the computing system may verify the validity of the image by validating the metadata. The computing system may validate the metadata by identifying metadata associated with the publisher and confirming that the metadata from the signed token matches the metadata associated with the publisher. The computing system may verify the image if the metadata from the signed token matches the metadata associated with the publisher.

In a fourth layer of the multi-layer verification process, the computing system may verify the validity of the image by validating the digital certificate. The computing system may verify a digital signature of the digital certificate based on a certificate authority associated with the digital certificate, verify a validity date, policy, key usage, etc. associated with the digital certificate, and/or verify that the digital certificate has not been revoked (e.g., using a certificate revocation list, an online certificate status protocol responder, etc.). The computing system may verify the image if the computing system determines the digital certificate is valid.

The computing system may determine if one or more layers of the multi-layer verification process are not satisfied that the computing system is unable to verify the validity of the image or the image is not validated. The computing system may verify the validity of the image if all or a portion of the layers of the multi-layer verification process are satisfied (or a number of layers of the multi-layer verification process greater than or equal to a threshold value are satisfied (e.g., more than four layers are satisfied). Based on verifying the validity of the image, the execution of the computer-executable instructions may further cause display of the metadata.

Fewer, more, or different steps can be included in the routine 400 as desired. For example, the image validation system 104 may not sign the token and may embed an unsigned token in the image. As another example, if the image validation system 104 determines that the image is not validated, the image validation system 104 may indicate that the validated image cannot be generated. Furthermore, the steps may performed in a different or order or concurrently. In some cases, blocks 402 and/or 404 may occur concurrently and/or block 402 may occur after block 406.

In certain cases, if, during display of the validated image, the image validation system 104 determines that the digital certificate, metadata, image, etc. has been updated, the image validation system 104 can provide an updated validated image.

It will be understood that while reference is made to the validation of an image and the verification of the validation of an image, the image validation system 104 may validate any data (e.g., textual data) and verify the validation of any data.

Figure 5:
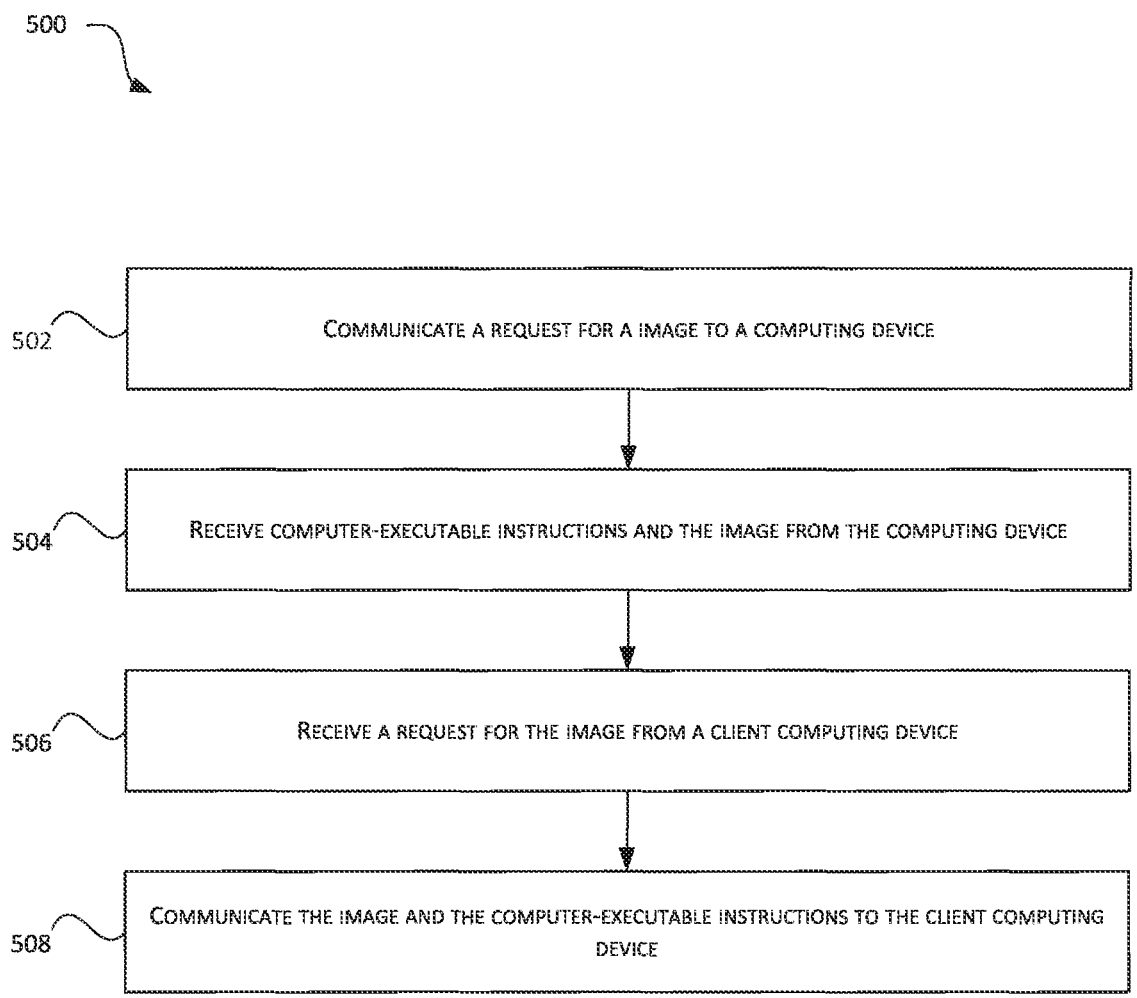

FIG. 5 is a flow diagram illustrating an embodiment of a routine 500 implemented by an administration system 110 to provide an image that has been validated.

At block 502, the administration system 110 communicates a request for an image to a computing device. For example, the computing device may be associated with an image validation system 104. In some cases, the image validation system 104 may be a certificate authority. In certain cases, the administration system 110 may not request the image. For example, the image validation system 104 may provide the image based on a predetermined policy. In some embodiments, the administration system 110 may communicate a request for a validated image. The request may include the image for validation, a digital certificate associated with a publisher of the image, and/or metadata associated with the image.

At block 504, the administration system 110 receives computer-executable instructions and the image from the computing device. As described herein, the administration system 110 may receive the image and the computer-executable instructions from the image validation system 104. The image may be a validated image and may be embedded with a signed token. The token may be signed with a private key to generate the signed token. The signed token may include a digital signature based at least in part on a private key associated with the publisher computing device, a hash of a portion of the image, and the digital certificate.

At block 506, the administration system 110 receives a request for the image from a client computing device 102. The administration system 110 may receive the request for the image as a request for an application that includes the image (e.g., as a hypertext transfer protocol ("HTTP") GET request or other internet protocol). In other embodiments, the request for the image may be any other type of request.

At block 508, the administration system 110 communicates the image and the computer-executable instructions to the client computing device 102. In some cases, the image can be in the form of computer-executable code and the administration system 110 can communicate the computer-executable code to the client computing device 102 for execution. The administration system 110 can also communicate computer-executable code for an application for display of the image. For example, if the application is a website, the administration system 110 can communicate the code of the website to the client computing device for execution. When computer-executable instructions of the application are executed at the client computing device, the computer-executable instructions and the computer-executable code of the image can also be executed. When executed, the computer-executable code of the image can cause the client computing device to display the image.

Execution of the computer-executable instructions may cause a verification of a validation of the image based on the hash from the signed token, the digital certificate, the metadata, the digital signature, and/or a hash of the image. For example, execution of the computer-executable instructions may cause the image validation system 104 to verify a validity of the image by validating one or more of the hash from the signed token, the digital certificate, the metadata, the digital signature, and the hash of the image.

Figure 6:
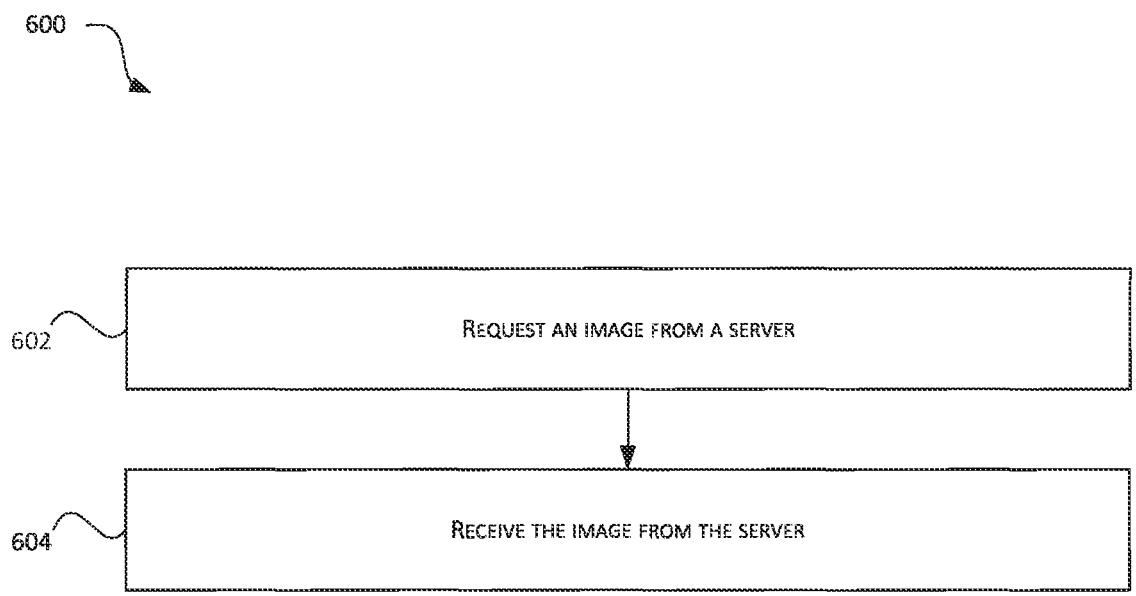

FIG. 6 is a flow diagram illustrating an embodiment of a routine 600 implemented by a client computing device 102 to request an image.

At block 602, the client computing device 102 requests an image from a server (e.g., a server of the administration system 110). In certain cases, the client computing device 102 may request an application that includes the image. In some cases, the client computing device 102 may request the image and/or the application by opening a channel (e.g., a transmission control protocol ("TCP") channel) to the administration system 110. Further, the client computing device 102 may open the channel based on a uniform resource identifier (e.g., a uniform resource locator). In certain case, the client computing device 102 may request to download and/or install the application.

At block 604, the client computing device 102 receives the image from the server. The client computing device 102 may also receive an application associated with the image for display of the image. In certain cases, computer-executable instructions that cause the display of the image within the application are embedded within, linked to, or otherwise associated with, the computer-executable instructions of the application. For example, the application may be computer executable code that can be executed by the client computing device 102 that includes or is linked to the computer-executable instructions of the image. The client computing device 102 may also receive additional computer-executable instructions for the validation of the image.

Execution of the computer-executable instructions may cause a verification of a validation of the image based on the hash from the signed token, the digital certificate, the metadata, the digital signature, and/or a hash of the image. For example, execution of the computer-executable instructions may cause the image validation system 104 to verify a validity of the image by validating one or more of the hash from the signed token, the digital certificate, the metadata, the digital signature, and the hash of the image.

Example Computing System

Figure 7:
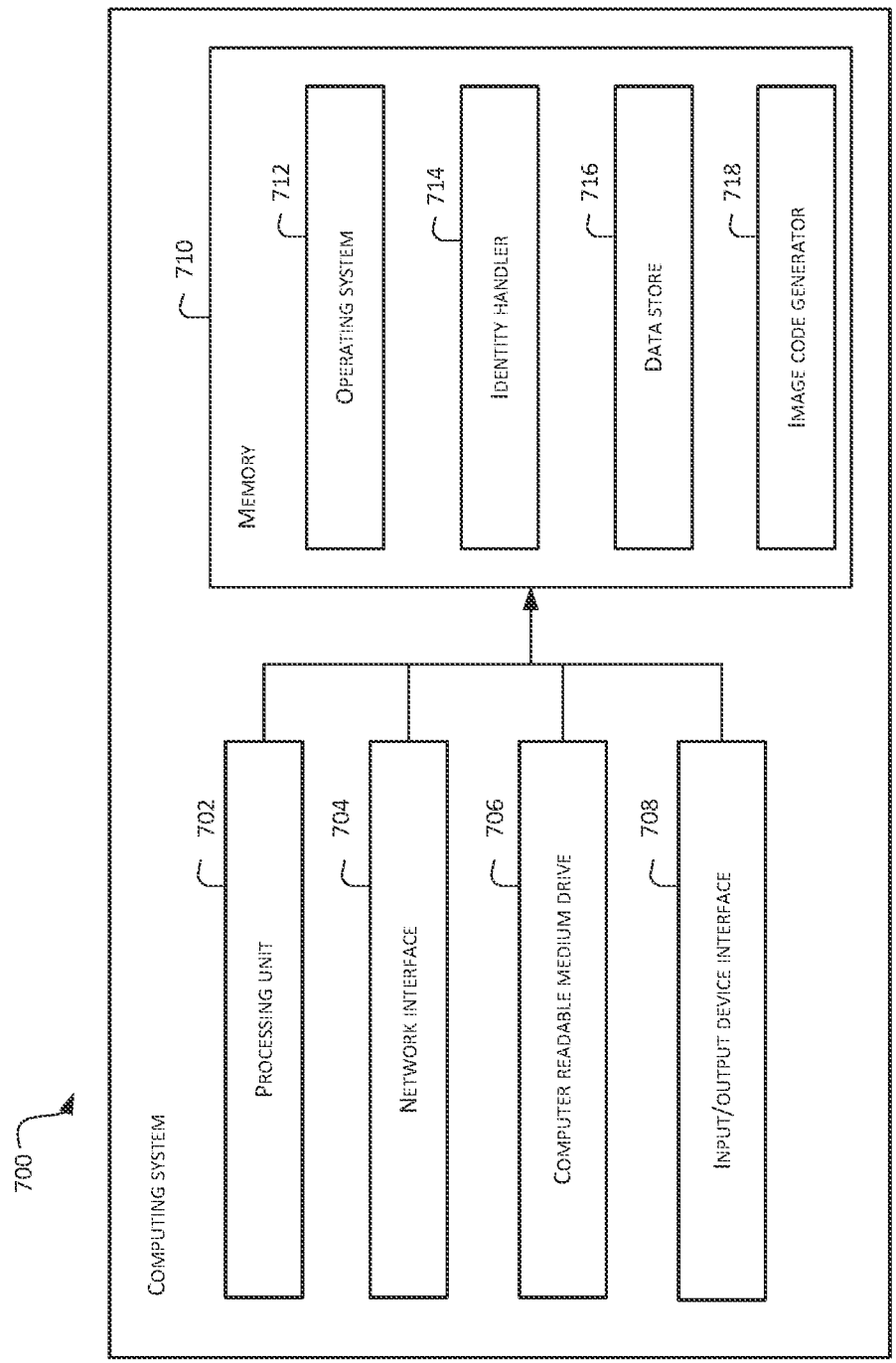
FIG. 7 shows an example computing device that may be used to implement aspects of the present disclosure.

FIG. 7 illustrates an example computing system 700 configured to execute the processes and implement the features described above. In some embodiments, the computing system 700 may include: one or more computer processors 702, such as physical central processing units ("CPUs"); one or more network interfaces 704, such as a network interface cards ("NICs"); one or more computer-readable medium drives 706, such as a high density disk ("HDDs"), solid state drives ("SDDs"), flash drives, and/or other persistent non-transitory computer-readable media; an input/output device interface 708, such as an input/output ("IO") interface in communication with one or more microphones; and one or more computer-readable memories 710, such as random access memory ("RAM") and/or other volatile non-transitory computer-readable media.

The network interface 704 can provide connectivity to one or more networks or computing systems. The computer processor 702 can receive information and instructions from other computing systems or services via the network interface 704. The network interface 704 can also store data directly to the computer-readable memory 710. The computer processor 702 can communicate to and from the computer-readable memory 710, execute instructions and process data in the computer-readable memory 710, etc.

The computer-readable memory 710 may include computer program instructions that the computer processor 702 executes to implement one or more embodiments. The computer-readable memory 710 can store an operating system 712 that provides computer program instructions for use by the computer processor 702 in the general administration and operation of the computing system 700. The computer-readable memory 710 can include computer program instructions and other information for implementing aspects of the present disclosure. For example, in one embodiment, the computer-readable memory 710 may include an identity information manager 714. As another example, the computer-readable memory 710 may include a data store 716. Further, the computer-readable memory 710 may include an image code generator 718. In some embodiments, multiple computing systems 700 may communicate with each other via their respective network interfaces 704, and can implement multiple sessions each session with a corresponding connection parameter (e.g., each computing system 700 may execute one or more separate instances of the processes 400, 500, and/or 600), in parallel (e.g., each computing system 700 may execute a portion of a single instance of a process 400, 500, or 600), etc.

Terminology

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, personal digital assistants ("PDAs"), and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for providing a verified image, the method comprising:
receiving a first image;
receiving a digital certificate associated with a publisher of the first image;
generating a token for the first image, wherein the token comprises:
a hash of at least a portion of the first image, and
the digital certificate;
signing the token with a private key to generate a signed token comprising a digital signature based at least in part on the private key;
embedding the signed token in the first image to generate a second image; and
providing the second image and computer-executable instructions to a computing device, wherein execution of the computer-executable instructions causes a verification of a validation of the second image based at least in part on a hash from the signed token, the hash of the at least a portion of the first image, and the digital signature,
wherein the computing device is a first computing device, wherein the signed token comprises metadata associated with the first image, wherein to verify the validation of the second image, a second computing device obtains the signed token from the verified image, obtains the hash from the signed token, obtains the hash of the at least a portion of the first image, compares the hash of the at least a portion of the first image with the hash from the signed token, and validates the metadata.

2. The computer-implemented method of claim 1, wherein the computing device is a first computing device, wherein to verify the validation of the second image, a second computing device obtains the signed token from the second image, obtains the hash from the signed token, obtains the hash of the at least a portion of the first image, compares the hash of the at least a portion of the first image with the hash from the signed token, and validates the digital signature using a public key.

3. The computer-implemented method of claim 2, wherein the second computing device verifies the validation of the second image further based at least in part on determining the hash of the at least a portion of the first image matches the hash from the signed token.

4. The computer-implemented method of claim 1, wherein the computing device is a first computing device, wherein to verify the validation of the second image, a second computing device obtains the signed token from the second image, obtains the hash from the signed token, generates a hash of the at least a portion of the second image, compares the hash of the at least a portion of the second image with the hash from the signed token, and validates the digital signature using a public key, wherein the hash of the at least a portion of the second image corresponds to the hash of the at least a portion of the first image.

5. The computer-implemented method of claim 1, wherein the computing device is a first computing device, wherein to verify the validation of the second image, a second computing device obtains the signed token from the verified image, obtains the hash from the signed token, obtains the hash of the at least a portion of the first image, compares the hash of the at least a portion of the first image with the hash from the signed token, and validates the digital certificate.

6. The computer-implemented method of claim 1, wherein the execution of the computer-executable instructions is based at least in part on an interaction with the second image.

7. The computer-implemented method of claim 1, wherein the execution of the computer-executable instructions is based at least in part on an interaction with the second image, wherein the execution of the computer-executable instructions further causes display of metadata associated with the first image based at least in part on verification of the validation of the second image.

8. The computer-implemented method of claim 1, wherein the execution of the computer-executable instructions further causes a validation of the digital certificate.

9. The computer-implemented method of claim 1, further comprising generating the hash of the at least a portion of the first image.

10. The computer-implemented method of claim 1, further comprising generating the hash of the at least a portion of the first image, wherein generating the hash of the at least a portion of the first image comprises:
obtaining an array of values, each value of the array of values corresponding to one or more pixels or subpixels of the first image; and
hashing the array of values.

11. The computer-implemented method of claim 1, further comprising generating the hash of the at least a portion of the first image using a hashing algorithm.

12. The computer-implemented method of claim 1, further comprising generating the hash of the at least a portion of the first image using a SHA-256 hashing algorithm.

13. The computer-implemented method of claim 1, wherein the hash of the at least a portion of the first image comprises a most significant bit hash of the at least a portion of the first image.

14. The computer-implemented method of claim 1, wherein the token further comprises metadata associated with the first image.

15. The computer-implemented method of claim 1, wherein the token further comprises metadata associated with the first image, wherein the metadata comprises a title, a caption, a date, a source, a location, or a time associated with the first image.

16. The computer-implemented method of claim 1, wherein the computing device is a first computing device, wherein receiving the first image comprises receiving the first image from a second computing device, wherein the digital certificate is further associated with the second computing device.

17. The computer-implemented method of claim 1, wherein embedding the signed token in the first image to generate the second image comprises:
    embedding the signed token in the first image using least significant bit steganography.

18. The computer-implemented method of claim 1, wherein the token is a JSON web token.

19. A computer-implemented method for providing a verified image, the method comprising:
    receiving a first image;
    receiving a digital certificate associated with a publisher of the first image;
    generating a token for the first image, wherein the token comprises:
        a hash of at least a portion of the first image, and
        the digital certificate;
    signing the token with a private key to generate a signed token comprising a digital signature based at least in part on the private key;
    embedding the signed token in the first image to generate a second image; and
    providing the second image and computer-executable instructions to a computing device, wherein execution of the computer-executable instructions causes a verification of a validation of the second image based at least in part on a hash from the signed token, the hash of the at least a portion of the first image, and the digital signature,
    wherein the computing device is a first computing device, wherein to verify the validation of the second image, a second computing device obtains the signed token from the verified image, obtains the hash from the signed token, obtains the hash of the at least a portion of the first image, compares the hash of the at least a portion of the first image with the hash from the signed token, and validates the digital certificate.

20. The computer-implemented method of claim 19, wherein the execution of the computer-executable instructions is based at least in part on an interaction with the second image.

21. The computer-implemented method of claim 19, wherein the execution of the computer-executable instructions further causes a validation of the digital certificate.

22. A computer-implemented method for providing a verified image, the method comprising:
    receiving a first image;
    receiving a digital certificate associated with a publisher of the first image;
    generating a token for the first image, wherein the token comprises:
        a hash of at least a portion of the first image, and
        the digital certificate;
    signing the token with a private key to generate a signed token comprising a digital signature based at least in part on the private key;
    embedding the signed token in the first image to generate a second image;
    providing the second image and computer-executable instructions to a computing device, wherein execution of the computer-executable instructions causes a verification of a validation of the second image based at least in part on a hash from the signed token, the hash of the at least a portion of the first image, and the digital signature; and
    generating the hash of the at least a portion of the first image, wherein generating the hash of the at least a portion of the first image comprises:
        obtaining an array of values, each value of the array of values corresponding to one or more pixels or sub-pixels of the first image;
        shifting, to the right within the array of values, one or more values of the array of values to generate a shifted array of values; and
        hashing the shifted array of values.

23. The computer-implemented method of claim 22, wherein the execution of the computer-executable instructions is based at least in part on an interaction with the second image.

24. The computer-implemented method of claim 22, wherein the execution of the computer-executable instructions further causes a validation of the digital certificate.

25. A non-transitory computer-readable medium comprising instructions for providing a verified image, the instructions executable by one or more computer processors for causing the one or more computer processors to perform steps of:
    receiving a first image;
    receiving a digital certificate associated with a publisher of the first image;
    generating a token for the first image, wherein the token comprises:
        a hash of at least a portion of the first image, and
        the digital certificate;
    signing the token with a private key to generate a signed token comprising a digital signature based at least in part on the private key;
    embedding the signed token in the first image to generate a second image; and
    providing the second image and computer-executable instructions to a computing device, wherein execution of the computer-executable instructions causes a verification of a validation of the second image based at least in part on a hash from the signed token, the hash of the at least a portion of the first image, and the digital signature,
    wherein the computing device is a first computing device, wherein the signed token comprises metadata associated with the first image, wherein to verify the validation of the second image, a second computing device obtains the signed token from the verified image, obtains the hash from the signed token, obtains the hash of the at least a portion of the first image, compares the hash of the at least a portion of the first image with the hash from the signed token, and validates the metadata.

26. A non-transitory computer-readable medium comprising instructions for providing a verified image, the instructions executable by one or more computer processors for causing the one or more computer processors to perform steps of:

receiving a first image;

receiving a digital certificate associated with a publisher of the first image;

generating a token for the first image, wherein the token comprises:
   a hash of at least a portion of the first image, and the digital certificate;

signing the token with a private key to generate a signed token comprising a digital signature based at least in part on the private key;

embedding the signed token in the first image to generate a second image; and providing the second image and computer-executable instructions to a computing device, wherein execution of the computer-executable instructions causes a verification of a validation of the second image based at least in part on a hash from the signed token, the hash of the at least a portion of the first image, and the digital signature, wherein the computing device is a first computing device, wherein to verify the validation of the second image, a second computing device obtains the signed token from the verified image, obtains the hash from the signed token, obtains the hash of the at least a portion of the first image, compares the hash of the at least a portion of the first image with the hash from the signed token, and validates the digital certificate.

* * * * *